(12) United States Patent
Baek et al.

(10) Patent No.: US 11,543,690 B2
(45) Date of Patent: Jan. 3, 2023

(54) DISPLAY DEVICE

(71) Applicant: LG ELECTRONICS INC., Seoul (KR)

(72) Inventors: Sangmin Baek, Seoul (KR); Kitae Keum, Seoul (KR); Juyoung Joung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 17/079,378

(22) Filed: Oct. 23, 2020

(65) Prior Publication Data

US 2022/0128855 A1     Apr. 28, 2022

(51) Int. Cl.
*G02F 1/1333*     (2006.01)
*G02F 1/1335*     (2006.01)

(52) U.S. Cl.
CPC .. *G02F 1/133308* (2013.01); *G02F 1/133526* (2013.01); *G02F 1/133553* (2013.01); *G02F 1/133314* (2021.01); *G02F 1/133331* (2021.01)

(58) Field of Classification Search
None
See application file for complete search history.

(56) References Cited

U.S. PATENT DOCUMENTS

| | | | |
|---|---|---|---|
| 2011/0310543 A1 | 12/2011 | Kim | |
| 2017/0083273 A1* | 3/2017 | Kim | G02F 1/13 |
| 2017/0322361 A1* | 11/2017 | Park | G02F 1/133603 |
| 2019/0137822 A1 | 5/2019 | Gwon et al. | |
| 2020/0103708 A1 | 4/2020 | Lee et al. | |
| 2021/0124209 A1* | 4/2021 | Kang | G02F 1/133605 |

OTHER PUBLICATIONS

European Patent Office Application Serial No. 20214886.2, Search Report dated Jun. 9, 2021, 10 pages.

* cited by examiner

*Primary Examiner* — Phu Vu
(74) *Attorney, Agent, or Firm* — Lee, Hong, Degerman, Kang & Waimey PC

(57) ABSTRACT

A display device is disclosed. The display device includes a display panel, a frame located at the rear of the display panel, an optical plate located between the frame and the display panel, a guide panel coupled to the frame, the guide panel being configured to support the optical plate, the guide panel being configured to provide a space between the optical plate and the frame, and a light source and a substrate configured to provide light to the optical plate in the space, wherein the display panel includes an active area configured to display an image and an inactive area configured not to display an image, the display panel is coupled to the optical plate via a first adhesive member, and the optical plate is fixed to the guide panel via a second adhesive member.

15 Claims, 28 Drawing Sheets

DISPLAY DEVICE

BACKGROUND OF THE INVENTION

1. Field of the Invention

The present disclosure relates to a display device.

2. Description of the Related Art

As the information society has developed, the demand for display devices is increasing in various forms, and accordingly, in recent years, various display devices, such as a liquid crystal display (LCD), an electroluminescent display (ELD), a vacuum fluorescent display (VFD), and an organic light-emitting diode (OLED) display, have been studied and used.

Thereamong, a liquid crystal panel of the LCD may include a liquid crystal layer and a thin film transistor (TFT) substrate and a color filter substrate disposed opposite each other in the state in which the liquid crystal layer is interposed therebetween. The liquid crystal panel may display an image using light from a backlight unit.

With an increase in the resolution of the display device, research on the backlight unit that provides high-quality light to the display panel has been actively conducted in recent years.

SUMMARY OF THE INVENTION

An object of the present disclosure is to solve the above and other problems.

Another object of the present disclosure is to provide a display device including a backlight unit having improved optical efficiency.

Another object of the present disclosure is to provide a display device capable of improving image quality.

Another object of the present disclosure is to provide a display device capable of securing reliability with respect to physical deformation caused by heat.

Another object of the present disclosure is to provide a backlight structure capable of providing light having high luminance and uniform distribution to a display panel having a large image display area.

A further object of the present disclosure is to provide a coupling structure of a display device capable of improving a dark area around a display panel.

In accordance with an aspect of the present disclosure, the above and other objects can be accomplished by the provision of a display device including a display panel, a frame located at the rear of the display panel, an optical plate located between the frame and the display panel, a guide panel coupled to the frame, the guide panel being configured to support the optical plate, the guide panel being configured to provide a space between the optical plate and the frame, and a light source and a substrate configured to provide light to the optical plate in the space, wherein the display panel includes an active area configured to display an image and an inactive area formed at the edge of the active area, the inactive area being configured not to display an image, the display panel is coupled to the optical plate via a first adhesive member disposed in contact with the inactive area, and the optical plate is fixed to the guide panel via a second adhesive member disposed in contact with an area corresponding to the inactive area between the optical plate and the guide panel.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Figure 1:
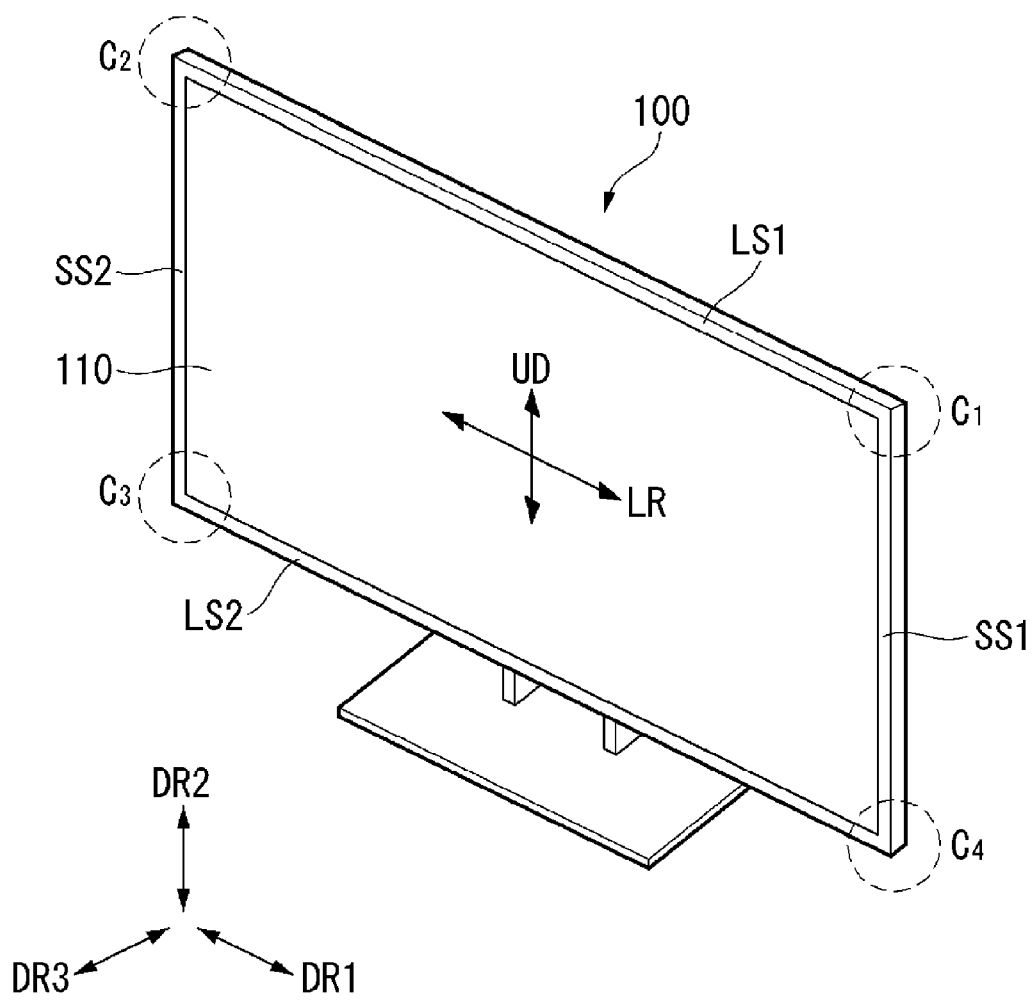
FIGS. 1 to 6 are views examples of a display device related to the present disclosure.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted.

In the following description, with respect to constituent elements used in the following description, the suffixes "module" and "unit" are used or combined with each other only in consideration of ease in the preparation of the specification, and do not have or serve different meanings. Also, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions included in the idea and scope of the present disclosure.

Hereinafter, a liquid crystal panel will be described as a display panel. However, the present disclosure is not limited to the liquid crystal panel.

Also, in the following description, a display device 100 may include a first long side LS1, a second long side LS2 opposite the first long side LS1, a first short side SS1 adjacent to the first long side LS1 and the second long side LS2, and a second short side SS2 opposite the first short side SS1.

Here, the first short side SS1 may be referred to as a first side area, the second short side SS2 may be referred to as a second side area opposite the first side area, the first long side LS1 may be referred to as a third side area adjacent to the first side area and the second side area and located between the first side area and the second side area, and the second long side LS2 may be referred to as a fourth side area adjacent to the first side area and the second side area, located between the first side area and the second side area, and opposite the third side area.

In addition, although the lengths of the first and second long sides LS1 and LS2 are shown and described as being greater than the lengths of the first and second short sides SS1 and SS2 for convenience of description, the lengths of the first and second long sides LS1 and LS2 may be almost equal to the lengths of the first and second short sides SS1 and SS2.

Also, in the following description, a first direction DR1 may be a direction parallel to the long sides LS1 and LS2 of the display device 100, and a second direction DR2 may be a direction parallel to the short sides SS1 and SS2 of the display device 100. A third direction DR3 may be a direction perpendicular to the first direction DR1 and/or the second direction DR2.

The first direction DR1 and the second direction DR2 may be commonly referred to as a horizontal direction. In addition, the third direction DR3 may be referred to as a vertical direction.

The side of the display device on which an image is displayed may be referred to as a front, a front surface, or a front side. The side of the display device 100 from which no image is viewed when the display device 100 displays an image may be referred to as a rear, a back, a rear surface, a rear side, a back surface, or a back side. When the display device 100 is viewed from the front or the front surface thereof, the first long side LS1 may be referred to as a top, a top surface, an upper surface, or an upper side, and the second long side LS2 may be referred to as a bottom, a bottom surface, a lower surface, or a lower side. The first short side SS1 may be referred to as a right, a right surface, or a right side, and the second short side SS2 may be referred to as a left, a left surface, or a left side.

The first long side LS1, the second long side LS2, the first short side SS1, and the second short side SS2 may be referred to as edges of the display device 100. In addition, the points at which the first long side LS1, the second long side LS2, the first short side SS1, and the second short side SS2 join with each other may be referred to as corners. For example, the point at which the first long side LS1 and the first short side SS1 join with each other may be referred to as a first corner C1, the point at which the first long side LS1 and the second short side SS2 join with each other may be referred to as a second corner C2, the point at which the second short side SS2 and the second long side LS2 join with each other may be referred to as a third corner C3, and the point at which the second long side LS2 and the first short side SS1 join with each other may be referred to as a fourth corner C4.

Here, the direction from the first short side SS1 to the second short side SS2 or the direction from the second short side SS2 to the first short side SS1 may be referred to as a leftward-rightward direction LR. The direction from the first long side LS1 to the second long side LS2 or the direction from the second long side LS2 to the first long side LS1 may be referred to as a upward-downward direction UD.

Figure 2:
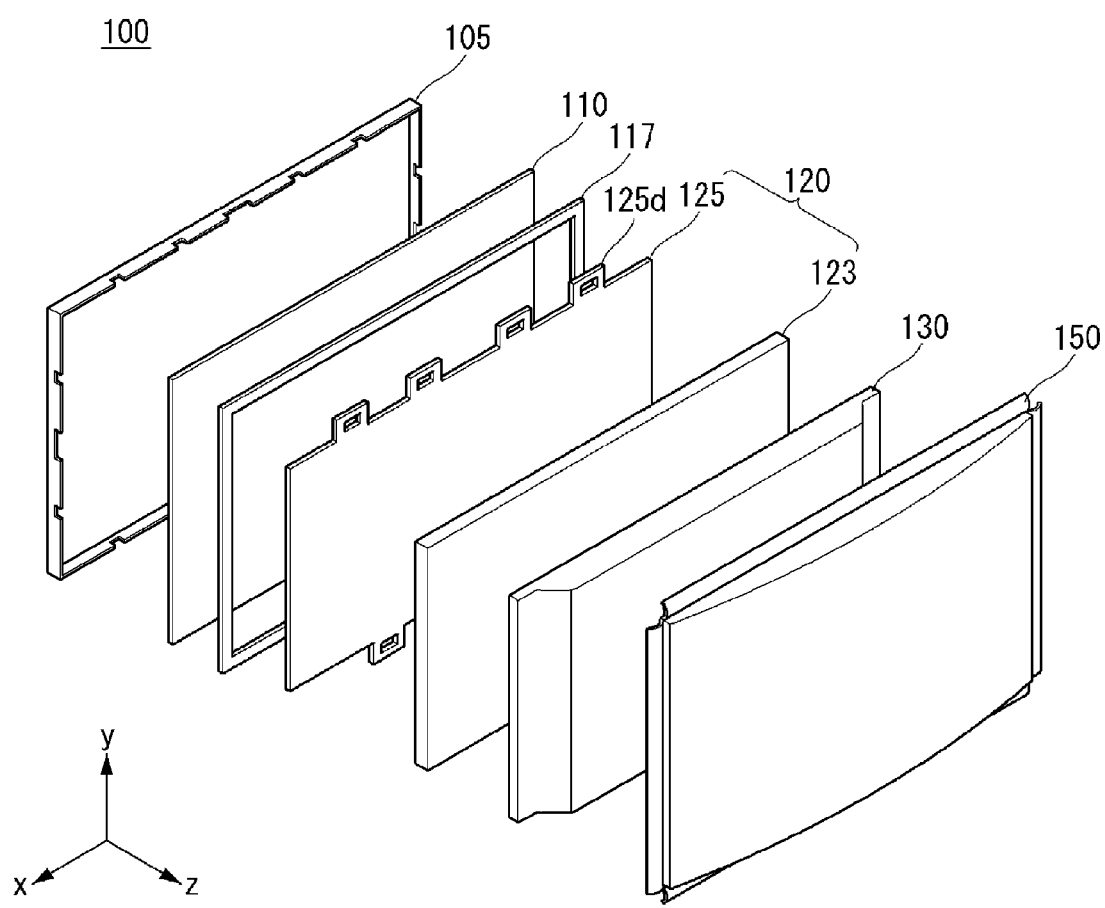

Referring to FIGS. 1 and 2, a display panel 110 may be located at the front of the display device 100, and may display an image. The display panel 110 may include a plurality of pixels, and may output an image with color, brightness, and saturation adjusted per pixel.

The display panel 110 may be divided into an active area in which an image is displayed and an inactive area in which no image is displayed. The display panel 110 may include a front substrate and a rear substrate opposite each other while a liquid crystal layer is interposed therebetween.

The front substrate may include a plurality of pixels, each of which includes red (R), green (G), and blue (B) subpixels. The front substrate may generate light corresponding to red, green, or blue in accordance with a control signal.

The rear substrate may include switching elements. The rear surface may switch a pixel electrode. For example, the pixel electrode may change molecular arrangement of the liquid crystal layer in accordance with a control signal applied from the outside. The liquid crystal layer may include a plurality of liquid crystal molecules. The arrangement of the liquid crystal molecules may be changed in response to a voltage difference between the pixel electrode and a common electrode. The liquid crystal layer may transmit light from a backlight unit 120 to the front substrate.

A front cover 105 may cover at least a portion of each of the front surface and the lateral surface of the display panel 110. The front cover 105 may have a hollow rectangular frame shape.

The front cover 105 may be divided into a front surface cover and a lateral surface cover. That is, the front cover 105 may be divided into a front surface cover located at the front surface of the display panel 100 and a lateral surface cover located at the lateral surface of the display panel 110. The front surface cover and the lateral surface cover may be separately configured. One of the front surface cover and the lateral surface cover may be omitted. For example, only the lateral surface cover may be provided without the front surface cover for beautiful design.

A guide panel 117 may be located at the rear of the display panel 110. The guide panel 117 may support a portion of the rear surface of the display panel 110. The guide panel 117 may be brought into contact with the contour of the display panel 110. The guide panel 117 may be coupled to a frame 130.

The backlight unit 120 may be located at the rear of the display panel 100. The backlight unit 120 may include a plurality of light sources. The backlight unit 120 may be a direct type backlight unit or an edge type backlight unit. In the case in which the backlight unit 120 is an edge type backlight unit, the backlight unit 120 may further include a light guide panel (LGP).

The backlight unit 120 may be located at the front surface of the frame 130. For example, the plurality of light sources may be disposed at the front surface of the frame 130. In this case, the backlight unit 120 may be commonly referred to as a direct type backlight unit.

The backlight unit 120 may be driven using an entire driving method or a partial driving method, such as local dimming or impulsive driving. The backlight unit 120 may include an optical sheet 125 and an optical layer 123.

The optical sheet 125 may disperse light from the light sources. The optical sheet 125 may include a plurality of layers. For example, the optical sheet 125 may include at least one prism sheet and/or at least one diffusion sheet.

The optical sheet 125 may include at least one coupling part 125d. The coupling part 125d may be coupled to the front cover 105, the frame 130, and/or a back cover 150. That is, the coupling part 125d may be directly coupled to the front cover 105, the frame 130, and/or the back cover 150. Alternatively, the coupling part 125d may be coupled to a structure coupled to the front cover 105, the frame 130, and/or the back cover 150. That is, the coupling part 125d may be indirectly coupled to the front cover 105, the frame 130, and/or the back cover 150.

The optical layer 123 may include a light source. The details of the optical layer 123 will be described later. The frame 130 may support components of the display device 100. For example, the backlight unit 120 may be coupled to the frame 130. The frame 130 may include a metal material, such as an aluminum alloy.

The back cover 150 may be located at the rear of the display device 100. The back cover 150 may protect components disposed therein. At least a portion of the back cover 150 may be coupled to the frame 130 and/or the front cover 105. For example, the back cover 150 may be a member formed by resin injection.

Figure 3:
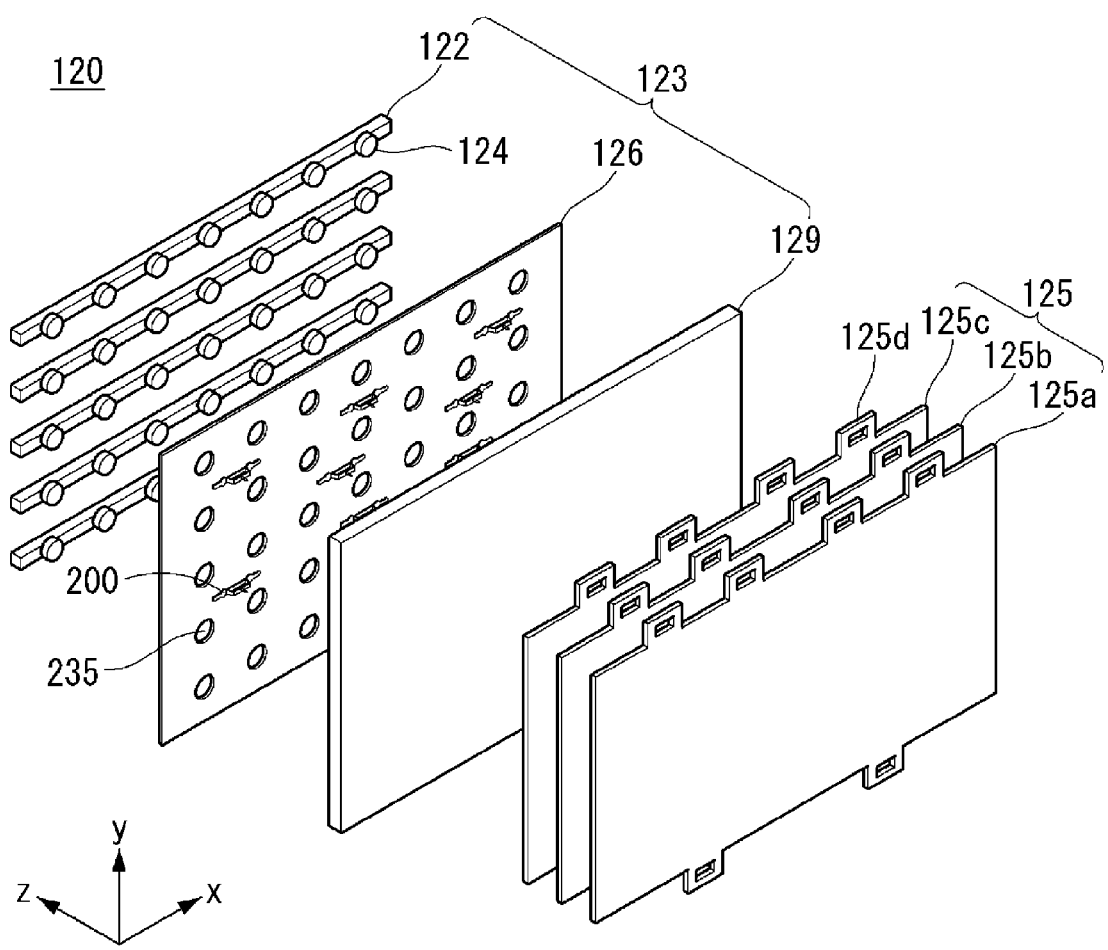

Referring to FIG. 3, the backlight unit 120 may include an optical layer 123 including a substrate 122, at least one light assembly 124, a reflection sheet 126, and a diffusion plate 129 and an optical sheet 125 located at the front of the optical layer 123. However, the construction of the backlight unit 120 is not limited thereto, and one or more components of the backlight unit 120 may be omitted.

The substrate 122 may be configured in the form of a plurality of straps extending in the first direction while being spaced apart from each other by a predetermined distance in the second direction perpendicular to the first direction.

The at least one light assembly 124 may be mounted on the substrate 122. An electrode pattern configured to interconnect an adaptor and the light assembly 124 may be formed on the substrate 122. For example, the electrode pattern may be a carbon nanotube (CNT) electrode pattern.

The substrate 122 may be made of at least one of polyethylene terephthalate (PET), glass, polycarbonate (PC), and silicon. The substrate 122 may be a printed circuit board (PCB).

The light assemblies 124 may be disposed at the substrate 122 while being spaced from each other by a predetermined distance in the first direction. The diameter of the light assembly 124 may be greater than the width of the substrate 122. That is, the diameter of the light assembly 124 may be greater than the length of the substrate 122 in the second direction.

The light assembly 124 may be a light-emitting diode (LED) chip or a light-emitting diode package including at least one light-emitting diode chip.

The light assembly 124 may include a color LED configured to emit at least one of red, blue, and green or a white LED. The color LED may include at least one of a red LED, a blue LED, and a green LED.

The light source included in the light assembly 124 may be chip-on-board (COB) type light source. In the COB type light source, the light source, i.e. the LED chip, is directly coupled to the substrate 122. In this case, the manufacturing process may be simplified. In addition, resistance may be reduced, whereby the amount of energy that is lost as heat may be reduced. That is, power efficiency of the light assembly 124 may be increased. The COB type light source may provide brighter light. The COB type light source may have a smaller thickness and weight than conventional light sources.

The reflection sheet 126 may be located at the front surface of the substrate 122. The reflection sheet 126 may have a through hole 235, and the light assembly may be inserted into the through hole 235.

The reflection sheet 126 may reflect light from the light assembly 124 forwards. In addition, the reflection sheet 126 may reflect light reflected by the diffusion plate 129 toward the diffusion plate 129.

The reflection sheet 126 may include at least one of a metal and a metal oxide as a reflective material. For example, the reflection sheet 126 may include a metal and/or a metal oxide having high reflectance, e.g. at least one of aluminum (Al), silver (Ag), gold (Au), and titanium dioxide ($TiO_2$).

The reflection sheet 126 may be formed on the substrate 122 by deposition and/or coating of a metal and a metal oxide. Ink including a metal material may be printed on the reflection sheet 126. A deposition layer may be formed on the reflection sheet 126 using a vacuum deposition method, such as a thermal deposition method, an evaporation method, or a sputtering method. A coating layer and/or a print layer may be formed on the reflection sheet 126 using a printing method, a gravure coating method, or a silk screen method.

An air gap may be located between the reflection sheet 126 and the diffusion plate 129. The air gap may widely spread light from the light assembly 124. In order to maintain the air gap, a support 200 may be located between the reflection sheet 126 and the diffusion plate 129. The air gap may be referred to as an optical gap.

Resin may be deposited on the light assembly 124 and/or the reflection sheet 126. The resin may diffuse light from the light assembly 124. The diffusion plate 129 may diffuse light from the light assembly 124 upwards.

The optical sheet 125 may be located at the front of the diffusion plate 129. The rear surface of the optical sheet 125 may be opposite the diffusion plate 129, and the front surface of the optical sheet 125 may be opposite the rear surface of the display panel 110.

The optical sheet 125 may include at least one sheet. Specifically, the optical sheet 125 may include at least one prism sheet and/or at least one diffusion sheet. The plurality of sheets included in the optical sheet 125 may be in an adhered state or in a tight contact state.

The optical sheet 125 may include a plurality of sheets having different functions. For example, the optical sheet 125 may include first to third optical sheets 125a to 125c. The first optical sheet 125a may have the function of a diffusion sheet, and each of the second and third optical sheets 125b and 125c may have the function of a prism sheet. The number and/or position of the diffusion sheet and the prism sheet may be changed.

The diffusion sheet may prevent partial concentration of light from the diffusion plate such that light distribution is further uniform. The prism sheet may condense light from the diffusion sheet such that light is intensively incident on the display panel 110.

The coupling part 125d may be formed at one side or at least one of the edges of the optical sheet 125. The coupling part 125d may be formed at at least one of the first to third optical sheets 125a to 125c.

The coupling part 125d may be formed at the long sides or the edges of the optical sheet 125. The coupling part 125d formed at the first long side and the coupling part 125d formed at the second long side may be asymmetric. For example, the position and/or number of the coupling part 125d at the first long side and the coupling part 125d at the second long side may be different from each other.

Figure 4:
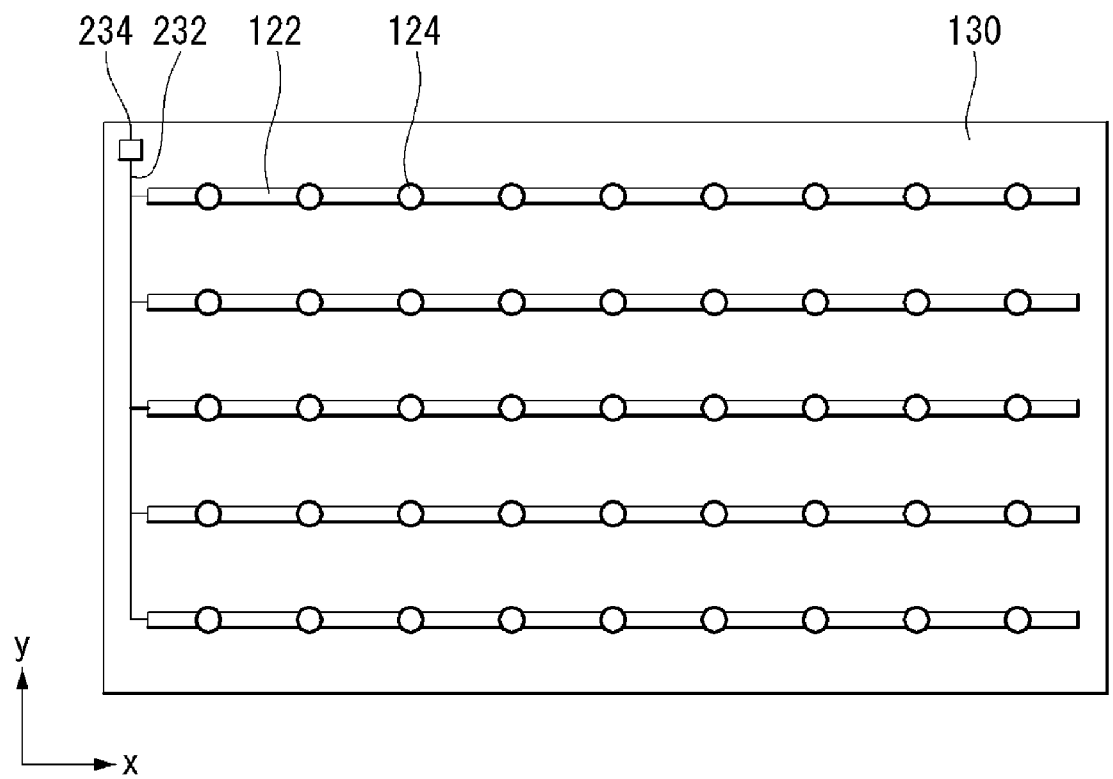

Referring to FIG. 4, a substrate 122 including a plurality of straps extending in the first direction while being spaced apart from each other by a predetermined distance in the second direction perpendicular to the first direction may be provided on the frame 130. One side of the plurality of straps of the substrate 122 may be connected to a wiring electrode 232.

The wiring electrode 232 may extend in the second direction. The wiring electrode 232 may be connected to one side of the substrate 122 while being spaced apart from the substrate 122 by a predetermined distance in the second direction.

A wiring hole 234 may be formed at one end of the wiring electrode 232. The wiring hole 234 may be a microhole formed through the frame 130. The wiring hole 234 may extend to the rear surface of the frame 130 via the wiring hole 234. The wiring hole 234 may be electrically connected to an adaptor (not shown) located at the rear surface of the frame 130 via the wiring hole 234.

The light assemblies 124 may be mounted on the substrate 122 while being spaced apart from each other by a predetermined distance in the first direction. The diameter of each of the light assemblies 124 may be greater than the width of the substrate 122 in the second direction.

Figure 5:
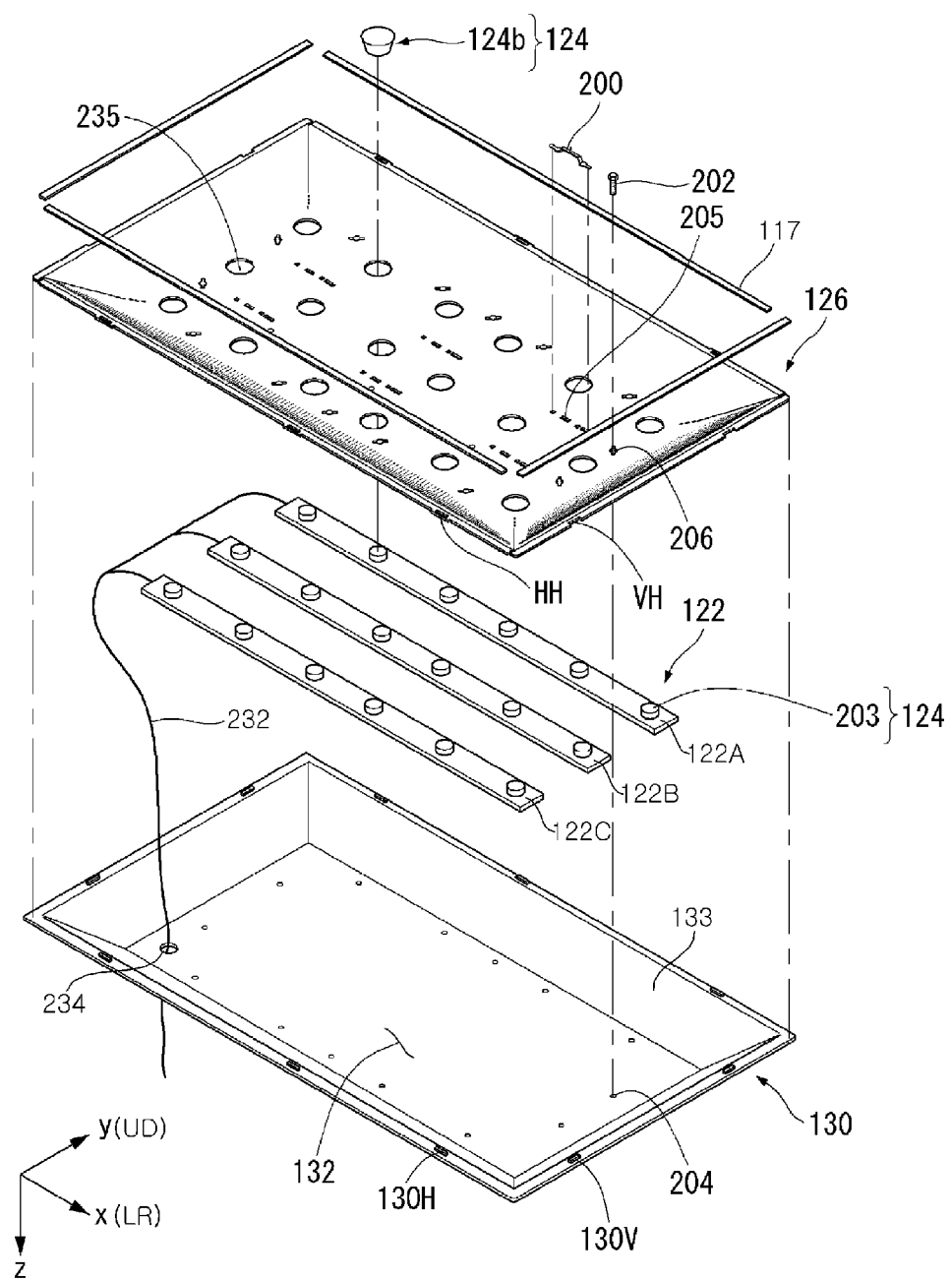

Referring to FIG. 5, the frame 130 may include a flat part 132 and an inclined part 133. The flat part 132 may have a flat shape. The inclined part 133 may have a uniform inclination relative to the flat part 132, and may extend forwards from the flat part 132. The frame 130 may generally have a tub shape. The reflection sheet 126 may generally have a tub shape, which may correspond to the shape of the frame 130. A space may be formed between the inclined part 133 and the reflection sheet 126.

The substrate 122 may be mounted or disposed on the flat part 132. A plurality of substrates 122 may be sequentially disposed. The plurality of substrates 122 may be spaced apart from each other. For example, a first substrate 122A may extend long in the leftward-rightward direction LR of the frame 130, and the leftward-rightward direction LR of the frame 130 may be disposed in the longitudinal direction. A second substrate 122B may extend long in the leftward-rightward direction LR of the frame 130, and may be mounted on the frame 130 while being spaced apart from the first substrate 122A. A third substrate 122C may extend long in the leftward-rightward direction LR of the frame 130, and may be mounted on the frame 130 while being spaced apart from the second substrate 122B.

The distance between the substrates 122 may vary depending on the number of pixels of the display panel 110 (see FIG. 2). For example, the distance between the substrates 122 necessary to provide light to an 8K-resolution display panel 110 may be less than the distance between the substrates 122 necessary to provide light to a 4K-resolution display panel 110. In the case in which the number of pixels of the display panel 110 is increased or the resolution of the display panel 110 is increased, the light transmission ratio of the display panel 110 may be low. In order to increase luminance of light from the backlight unit 120 (see FIG. 3), a large number of substrates 122 may be disposed.

The reflection sheet 126 may include a plurality of through holes 235. The plurality of through holes 235 may correspond in number to the plurality of light assemblies 124. The reflection sheet 126 may be placed on the frame 130 and/or the substrate 122. At this time, lenses 124b of the plurality of light assemblies 124 may protrude from the upper surface of the reflection sheet 126 through the plurality of through holes 235. The reflection sheet 126 may be coupled or fixed to the frame 130 via a fixing member 202. The support 200 may be mounted on the reflection sheet 126.

Coupling ribs 130H and 130V may be formed on the upper end of the inclined part 133 of the frame 130, and the reflection sheet 126 may have coupling holes VH and HH such that the coupling ribs 130H and 130V are inserted into the coupling holes VH and HH. Consequently, the reflection sheet 126 may be fixed to the frame 130.

The guide panel 117 may be located on the contour of the reflection sheet 126, and may be coupled to the frame 130. The guide panel 117 may support the display panel 110 (see FIG. 2). The guide panel 117 may be located at four sides of the reflection sheet 126.

Figure 6:
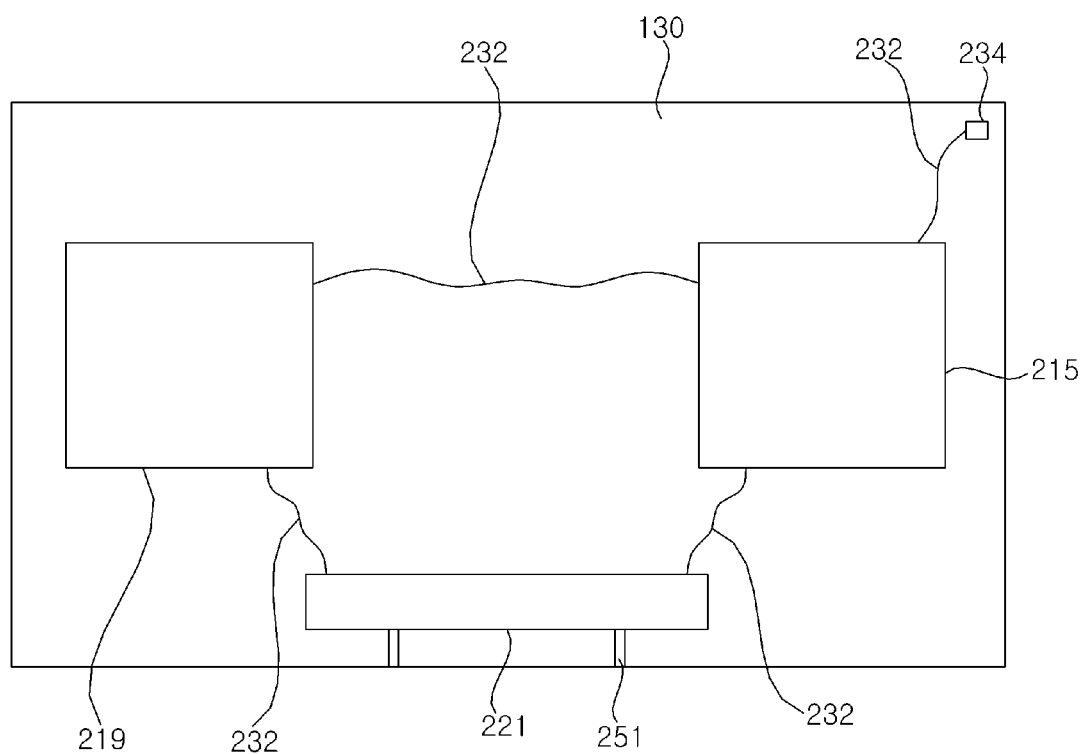

Referring to FIG. 6, the wiring electrode 232 extending from the front surface of the frame 130 via the wiring hole 234 may be electrically connected to a power supply 215. The power supply 215 may be a printed circuit board configured to supply power to the display device 100. The power supply 215 may convert AC power into DC power.

The power supply 215 may supply current to the light assembly 124 via the wiring electrode 232. The power supply 215 may be electrically connected to a main board 221 via the wiring electrode 232. The main board 221 may be spaced apart from the power supply 215 by a predetermined distance.

The main board 221 may be a printed circuit board configured to provide an interface for operation of the display device 100. In addition, the main board 221 may inspect and manage the operation of each component of the display device 100.

The main board 221 and the power supply 215 may be electrically connected to a T-con board 219 via the wiring electrode 232. The T-con board 219 may be a printed circuit board configured to transmit power or a signal from the power supply 215 or the main board 221 to the display panel 110. The T-con board 219 may be electrically connected to the display panel at the front surface of the frame 130 via a flexible flat cable (FFC) 251.

The printed circuit boards are shown as being connected to each other. However, the present disclosure is not limited thereto. At least some of the printed circuit boards may be connected to each other.

Figure 7:
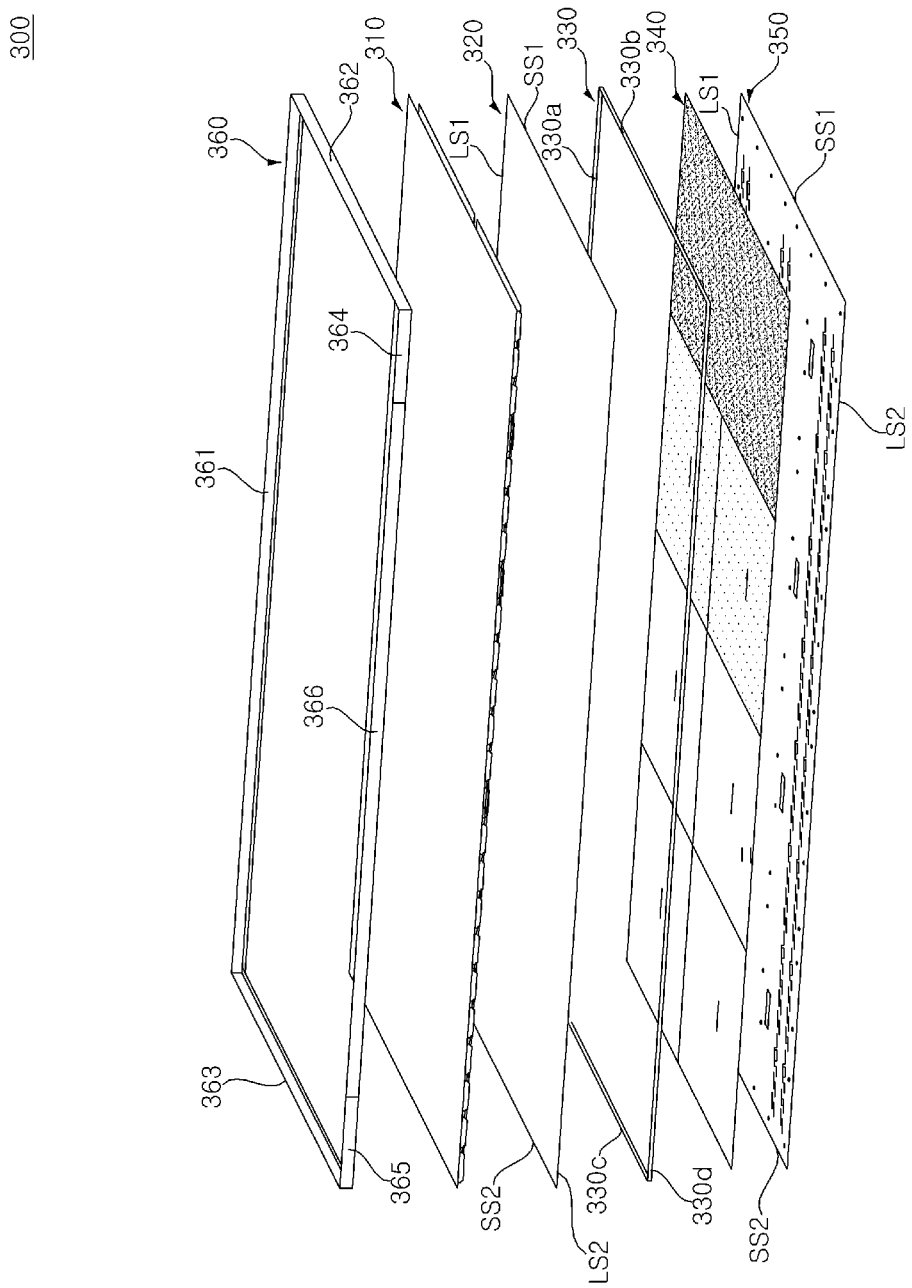
FIGS. 7 to 28 are views showing examples of a display device according to an embodiment of the present disclosure.

Referring to FIG. 7, a light assembly 340 may be placed at the front of a frame 350. The light assembly 340 may include boards, light sources mounted on the boards, and lenses configured to cover the light sources.

A guide panel 330 may be located adjacent to the edge of the frame 350. The guide panel 330 may include a first part 330a, a second part 330b, a third part 330c, and a fourth part 330d. The first part 330a may extend long along a first long side LS1 of the frame 350, the second part 330b may extend long along a first short side SS1 of the frame 350, the third part 330c may extend long along a second short side SS2 of the frame 350, and the fourth part 330d may extend long along a second long side LS2 of the frame 350. The first part 330a, the second part 330b, the third part 330c, and the fourth part 330d of the guide panel 330 may be individually or integrally formed.

An optical plate 320 may be located between a display panel 310 and the guide panel 330. The optical plate 320 may condense and/or disperse light from the light assembly 340, and may provide the light to the display panel 310. The optical plate 320 may be placed on the guide panel 330. The display panel 310 may be placed on the optical plate 320. The optical plate 320 may have physical properties identical or similar to those of the display panel 310.

A side frame 360 may cover the lateral surface of the display panel 310, and may be coupled to the frame 350. The side frame 360 may include a first part 361, a second part 362, a third part 363, a fourth part 364, a fifth part 365, and a sixth part 366.

The first part 361 may be located adjacent to a first long side LS1 of the display panel 310, and may extend long along the first long side LS1 of the frame 350. The second part 362 may be bent from the first part 361, may cover a first short side SS1 of the display panel 310, and may extend long along a first short side SS1 of the frame 350. The third part 363 may be bent from the first part 361, may cover a second short side SS2 of the display panel 310, and may extend long along the second short side SS2 of the frame 350.

The fourth part 364 may be bent from the second part 362, and may cover a portion of a second long side LS2 of the display panel 310. The fifth part 365 may be bent from the third part 363, and may cover a portion of the second long side LS2 of the display panel 310. The sixth part 366 may cover the second long side LS2 of the display panel 310, and may be located between the fifth part 365 and the fourth part 364. The sixth part 366 may be coupled to the fourth part 364 and/or the fifth part 365.

Figure 8:
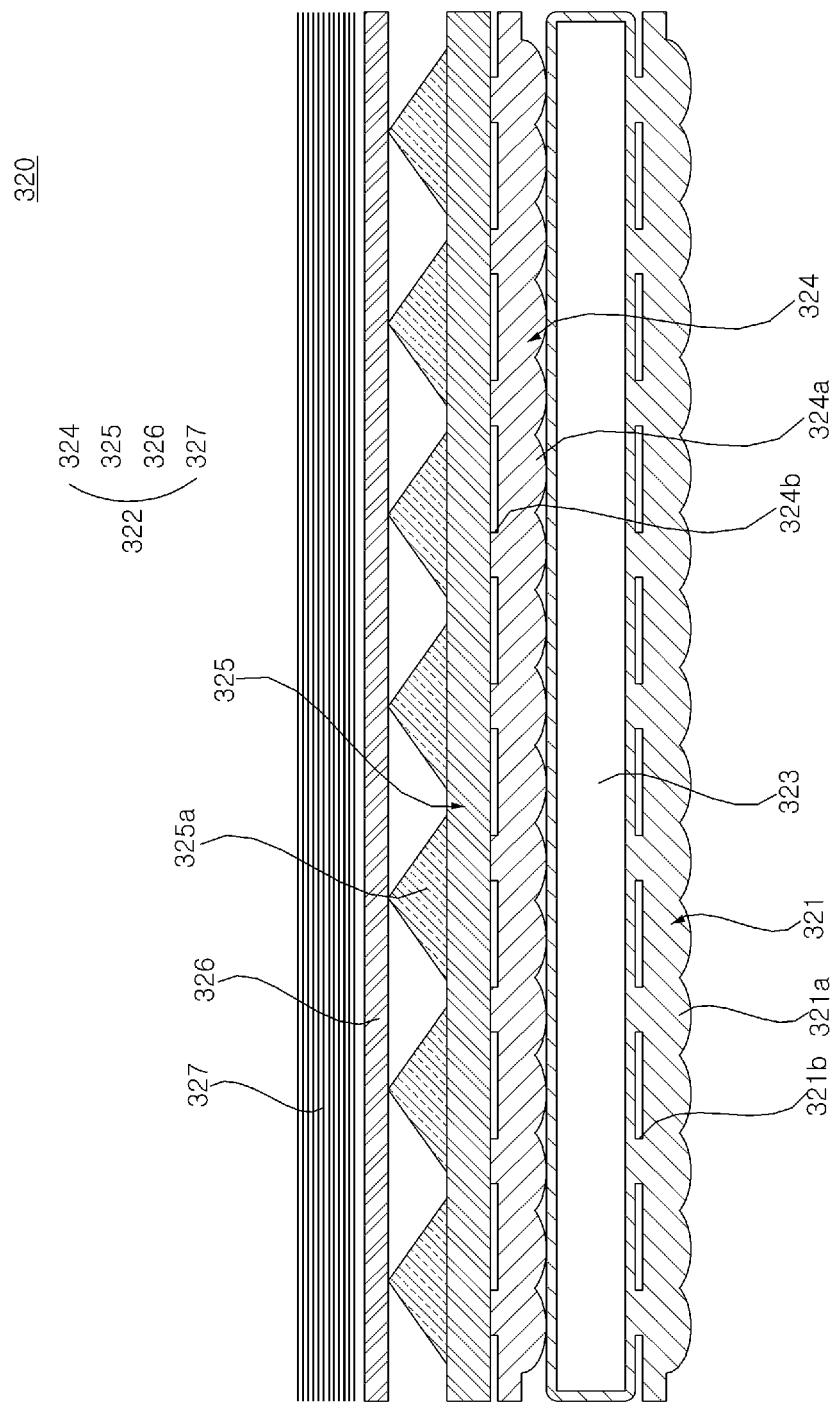

Referring to FIG. 8, the optical plate 320 may include a glass panel 323, a first optical sheet 321, and a second optical sheet 322. For example, the glass panel 323 may be a light guide panel. The area or size of the glass panel 323 may correspond to the area or size of the display panel 310 (see FIG. 7). The physical properties of the glass panel 323 may be identical to those of the display panel 310.

The first optical sheet 321 may be located at the lower surface of the glass panel 323. The first optical sheet 321 may be laminated with or adhered to the lower surface of the glass panel 323. For example, the first optical sheet 321 may be a diffusion sheet. The first optical sheet 321 may include protrusions 321a formed on the lower surface thereof. The protrusions 321a may form a pattern or an embossed structure. The first optical sheet 321 may include spacers 321b formed on the upper surface thereof. The spacers 321b may protrude from the upper surface of the first optical sheet 321, and may form a pattern. The spacers 321b may form an air gap between the first optical sheet 321 and the glass panel 323.

The second optical sheet 322 may be laminated with or adhered to the upper surface of the glass panel 323. The second optical sheet 322 may include a diffusion sheet 324, a prism sheet 325, a high-luminance sheet 326, and a protective film 327.

The diffusion sheet 324 may include protrusions 324a formed on the lower surface thereof. The protrusions 324a may form a pattern or an embossed structure. The diffusion sheet 324 may include spacers 324b formed on the upper surface thereof. The spacers 324b may protrude from the upper surface of the diffusion sheet 324, and may form a pattern. The spacers 324b may form an air gap between the prism sheet 325 and the glass panel 323.

The prism sheet 325 may be located on the diffusion sheet 324. The prism sheet 325 may be adhered to or laminated with the upper surface of the diffusion sheet 324 and/or the high-luminance sheet 326. The prism sheet 325 may have a triangular pattern 325a formed on the upper surface thereof. An air gap may be formed between the triangular pattern 325a and the high-luminance sheet 326.

The protective sheet 327 may be adhered to or laminated with the high-luminance sheet 326. The protective sheet 327 may cover the upper surface of the second optical sheet 322. The protective sheet 327 may be opposite or may be brought into contact with the display panel 310 (see FIG. 7).

Figure 9:
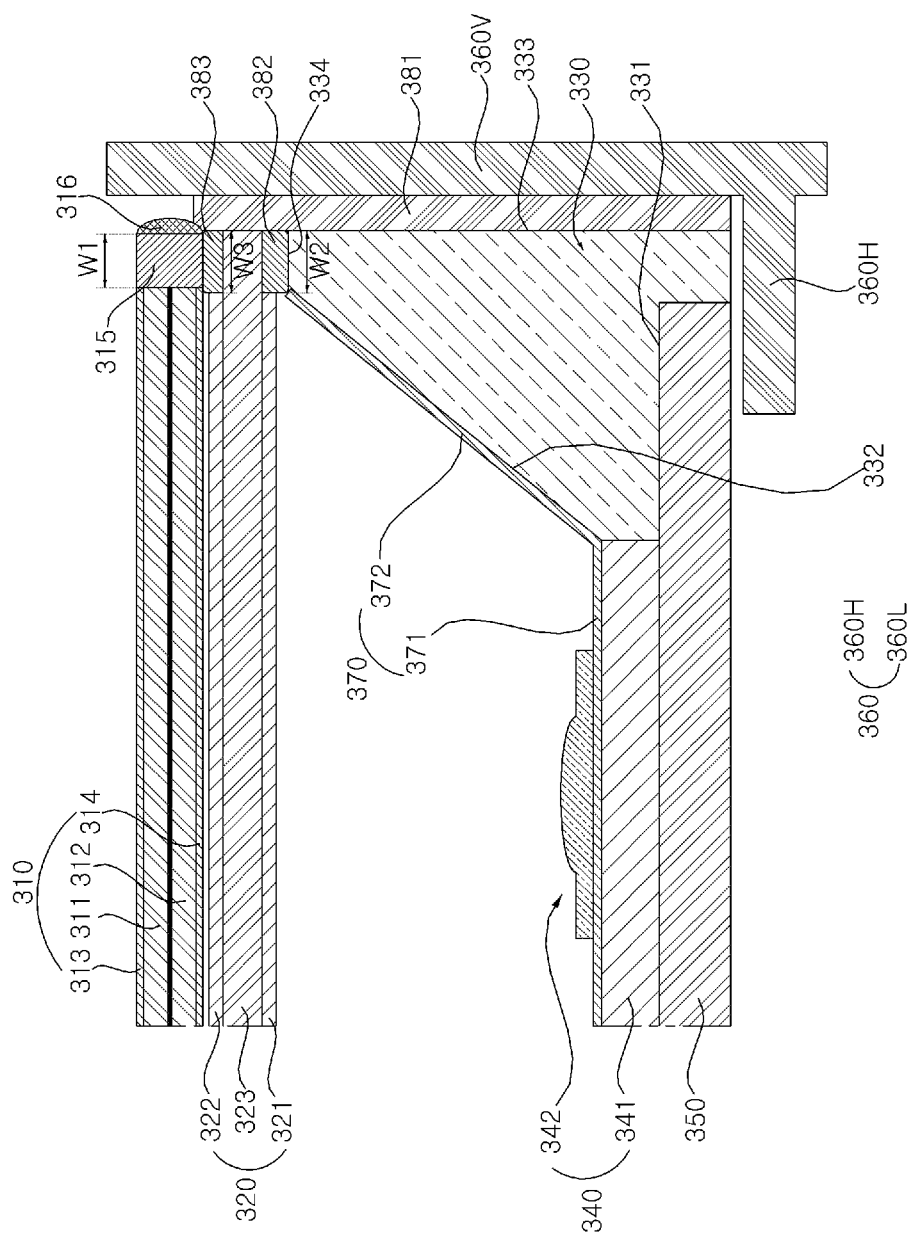

Referring to FIG. 9, a substrate 341 may be placed on the frame 350. A lens 342 may cover a light source mounted on the substrate 341. The guide panel 330 may be coupled to the edge of the frame 350. The guide panel 330 may include a coupling surface 331, a vertical surface 333, and an inclined surface 332.

The coupling surface 331 may define the lower surface of the guide panel 330. The coupling surface 331 may form a step at the lower surface of the guide panel 330. The frame 350 may be fixed to the coupling surface 331 of the guide panel 330.

The vertical surface 333 may extend from the coupling surface 331 of the guide panel 330 in a direction intersecting the coupling surface 331. The vertical surface 333 may be opposite the side frame 360. The inclined surface 332 may interconnect the vertical surface 333 and the coupling surface 331 of the guide panel 330. The inclined surface 332 may form an obtuse angle relative to the substrate 341.

A reflection sheet 370 may be located on the substrate 341 and/or the inclined surface 332 of the guide panel 330. The reflection sheet 370 may include a first part 371 and a second part 372. The first part 371 may be located on the substrate 341, and may be located between the substrate 341 and the lens 342. The second part 372 may extend from the first part 371, and may be located on the inclined surface 332 of the guide panel 330.

The optical plate 320 may be located on or fixed to the guide panel 330. The guide panel 330 may have a seating surface 334. The seating surface 334 may be formed at the upper end of the guide panel 330. The area or size of the first optical sheet 321 and/or the second optical sheet 322 may be less than the area or size of the glass panel 323. For example, the length of the first optical sheet 321 and/or the second optical sheet 322 in a longitudinal direction of the optical plate 320 may be less than the length of the glass panel 323.

A portion of the upper surface and a portion of the lower surface of the glass panel 323 may be exposed outside in the state of being adjacent to opposite ends of the glass panel 323. The optical plate 320 may be fixed to the seating surface 334 of the guide panel 330 via an adhesive member 382. For example, the adhesive member 382 may be formed by UV bonding or thermosetting bonding. The adhesive member 382 may be brought into contact with or may be adhered to the exposed lower surface of the glass panel 323 adjacent to the edge thereof.

The display panel 310 may be located at the upper side of the optical plate 320. The display panel 310 may include a front substrate 311, a rear substrate 312, a front polarizing film 313, a rear polarizing film 314, an inactive part 315, and a sealant 316. The front substrate 311 and the rear substrate 312 may opposite each other. The front polarizing film 313 may be adhered or fixed to the front substrate 311. The rear polarizing film 314 may be adhered or fixed to the rear substrate 312. The inactive part 315 may be formed at the distal end of the display panel 310. The sealant 316 may be formed at the lateral surface of the inactive part 315.

The width W1 of the inactive part 315 may correspond to the width S2 of the seating surface 334 of the guide panel 330. For example, the width W1 of the inactive part 315 may be 0.9 to 1.0 mm. In addition, the width W3 of the glass panel 323 exposed outside may correspond to the width S2 of the seating surface 334 of the guide panel 330 and/or the width W1 of the inactive part 315. As the display panel 310 is placed on the optical plate 320, an adhesive member 383 may be located between the inactive part 315 and the glass panel 323 exposed outside. For example, the adhesive member 383 may be formed by UV bonding or thermosetting bonding.

The side frame 360 may include a horizontal part 360H and a vertical part 360V. The vertical part 360V may cover the vertical surface 333 of the guide panel 330, the lateral surface of the optical plate 320, and the lateral surface of the display panel 310. The horizontal part 360H may extend from the vertical part 360V to the coupling surface 331 of the guide panel 330 and/or the rear surface of the frame 350. The horizontal part 360H may be coupled to the rear surface of the frame 350.

A barrier 381 may be located between the guide panel 330 and the side frame 360. The barrier 381 may be referred to as a shielding plate 381 or a reflection plate 381. The barrier 381 may cover the lateral surface of the optical plate 320. The barrier 381 may be brought into contact with the lateral surface of the optical plate 320 in order to shield light. For example, the barrier 381 may include an absorptive material or a reflective material. The barrier 381 may prevent leakage of light to the lateral surface of the optical plate 320.

Figure 10:
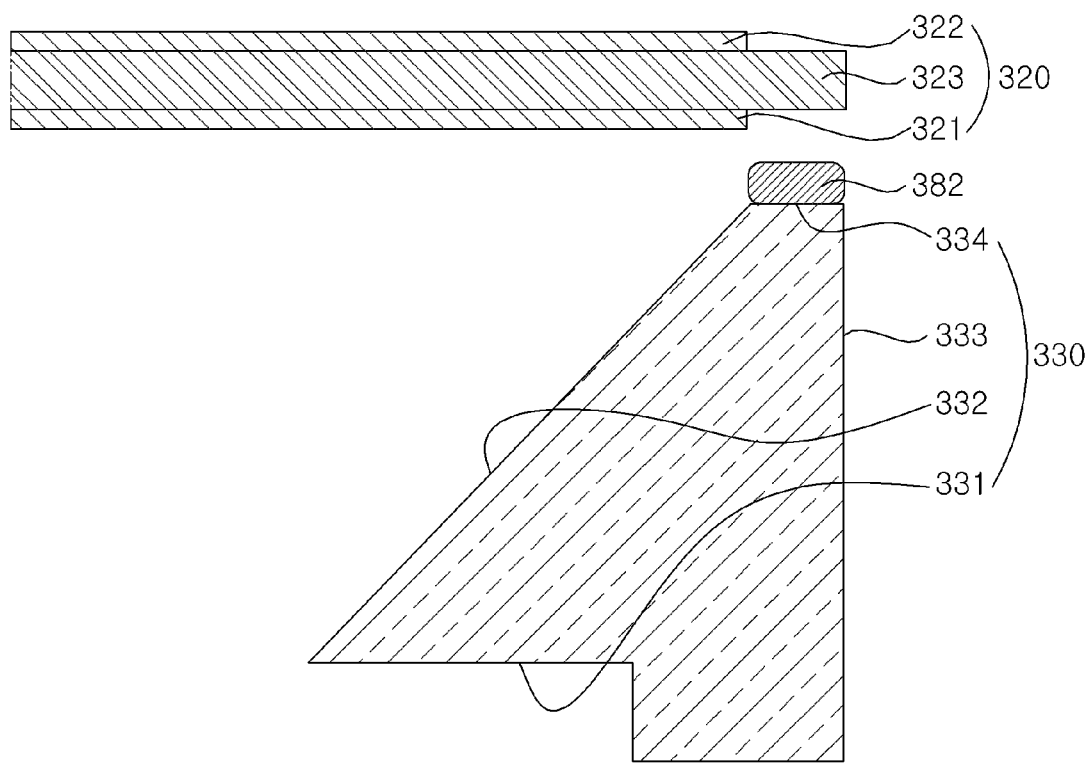
Figure 11:
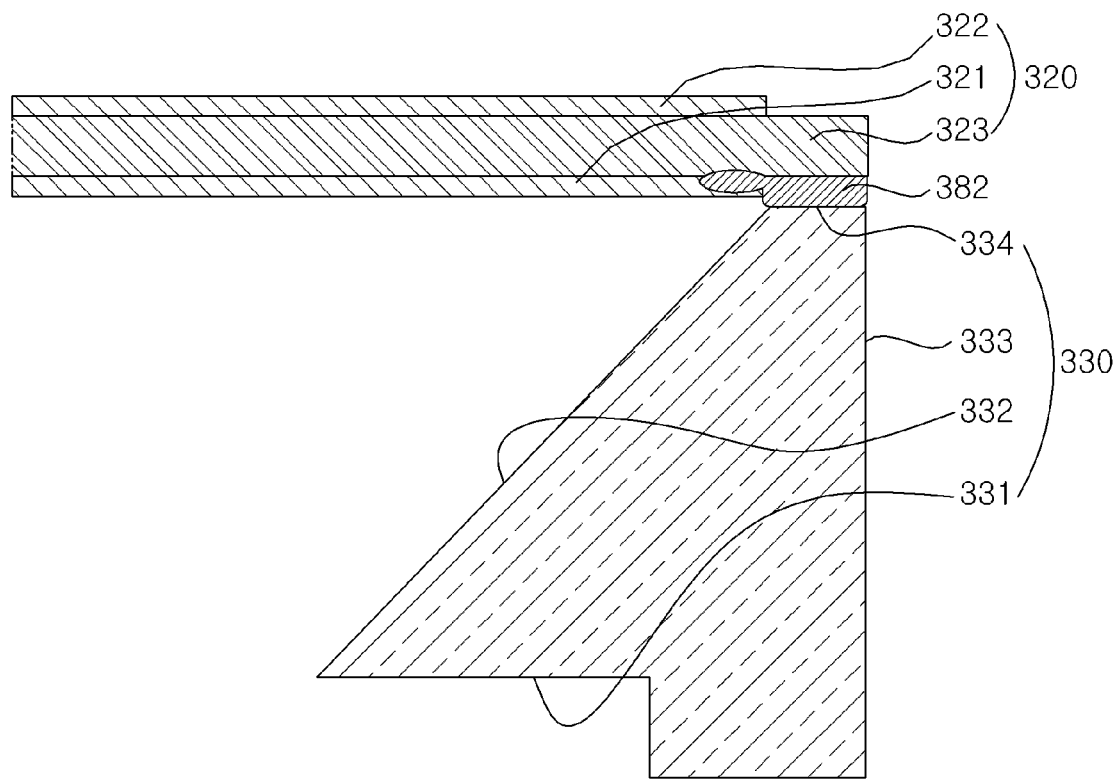

Referring to FIGS. 10 and 11, the optical plate 320 may be fixed to the guide panel 330. The adhesive member 382 may be applied to the seating surface 334 of the guide panel 330. The glass panel 323 may press the adhesive member 382 applied to the seating surface 334. For example, the adhesive member 382 may be UV resin or thermosetting resin. The adhesive member 382 may be UV-hardened or thermally hardened in the state in which the optical plate 320 is placed on the guide panel 330. At this time, the adhesive member 382 may permeate the optical plate 320, which may deteriorate optical properties of the optical plate 320.

Figure 12:
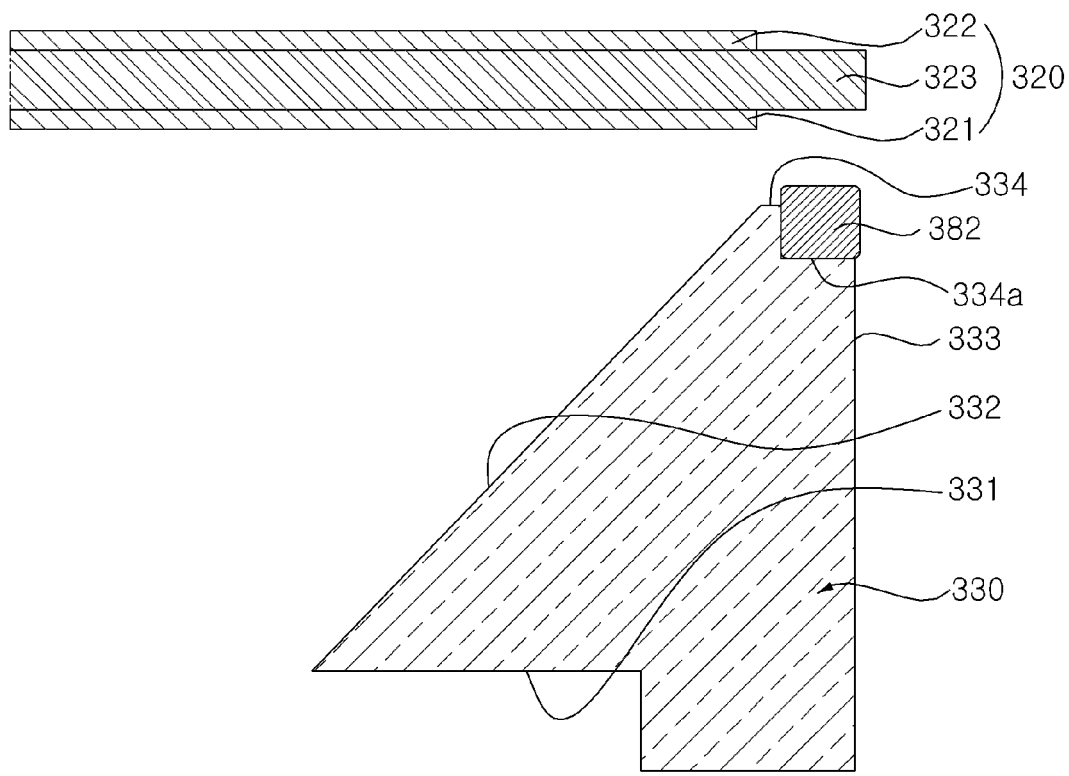
Figure 13:
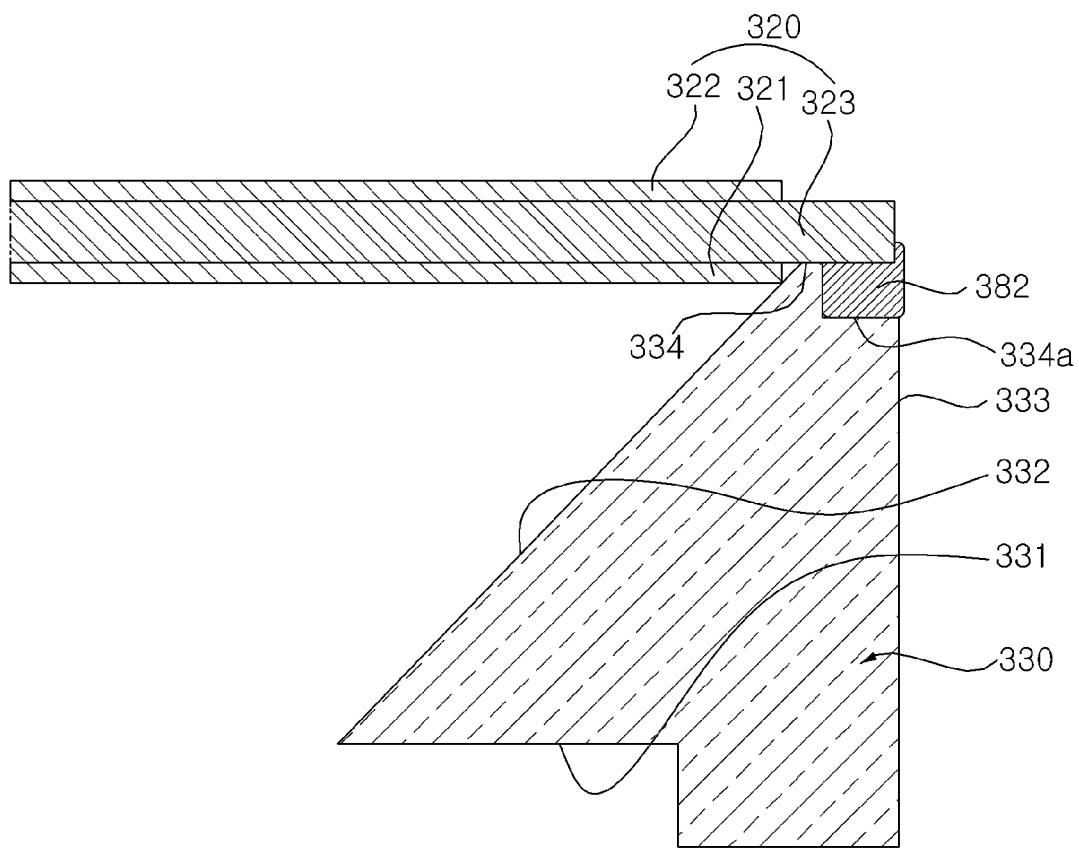

Referring to FIGS. 12 and 13, the optical plate 320 may be fixed to the guide panel 330. The guide panel 330 may have a receiving surface 334a. The receiving surface 334a may be formed as the result of the seating surface 334 being stepped. The receiving surface 334a may be lower than the seating surface 334. The receiving surface 334a may be connected to the vertical surface 333. The adhesive member 382 may be applied to the receiving surface 334a of the guide panel 330. The glass panel 323 may press the adhesive member 382 applied to the receiving surface 334a.

For example, the adhesive member 382 may be UV resin or thermosetting resin. The adhesive member 382 may be UV-hardened or thermally hardened in the state in which the optical plate 320 is placed on the guide panel 330. As a result, the adhesive member 382 may be securely fixed to the guide panel 330, whereby optical properties of the optical plate 320 may not be affected.

Figure 14:
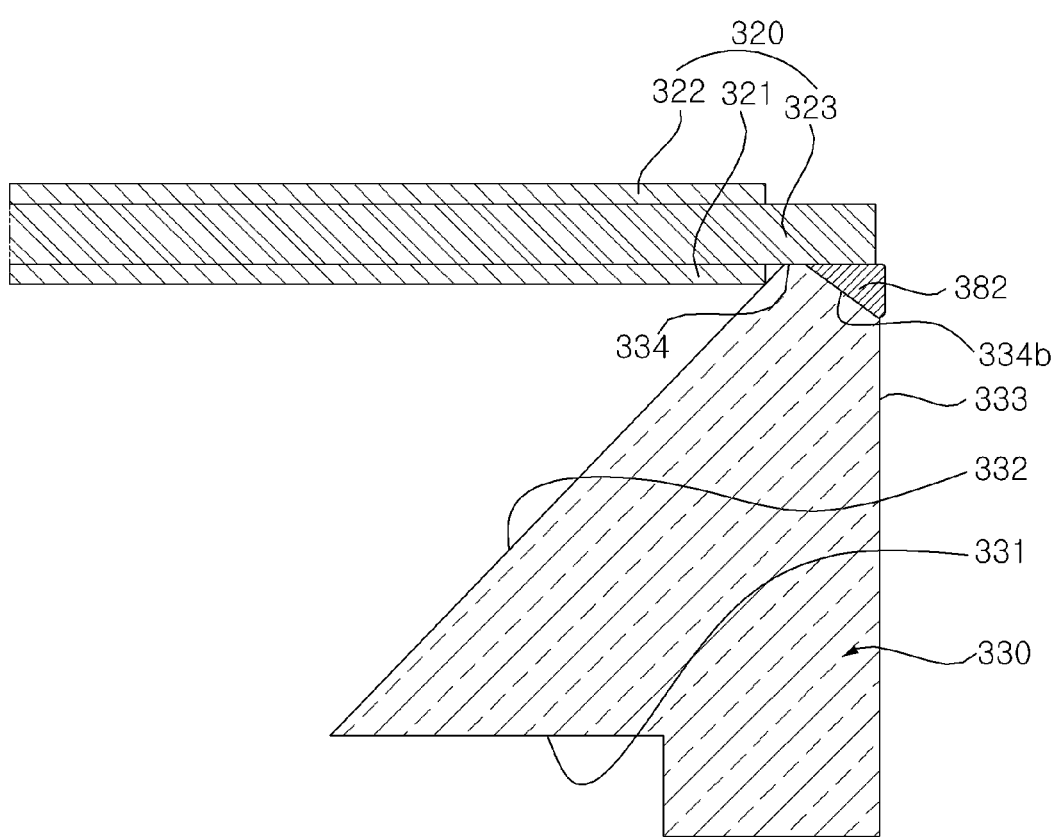

Referring to FIG. 14, the optical plate 320 may be fixed to the guide panel 330. The guide panel 330 may have a receiving surface 334b. The receiving surface 334b may be inclined relative to the seating surface 334. The receiving surface 334b may intersect the seating surface 334. The receiving surface 334b may be connected to the vertical surface 333. The adhesive member 382 may be applied to the receiving surface 334b of the guide panel 330. The glass panel 323 may press the adhesive member 382 applied to the receiving surface 334b.

For example, the adhesive member 382 may be UV resin or thermosetting resin. The adhesive member 382 may be UV-hardened or thermally hardened in the state in which the optical plate 320 is placed on the guide panel 330. As a result, the adhesive member 382 may be securely fixed to the guide panel 330, whereby optical properties of the optical plate 320 may not be affected.

Figure 15:
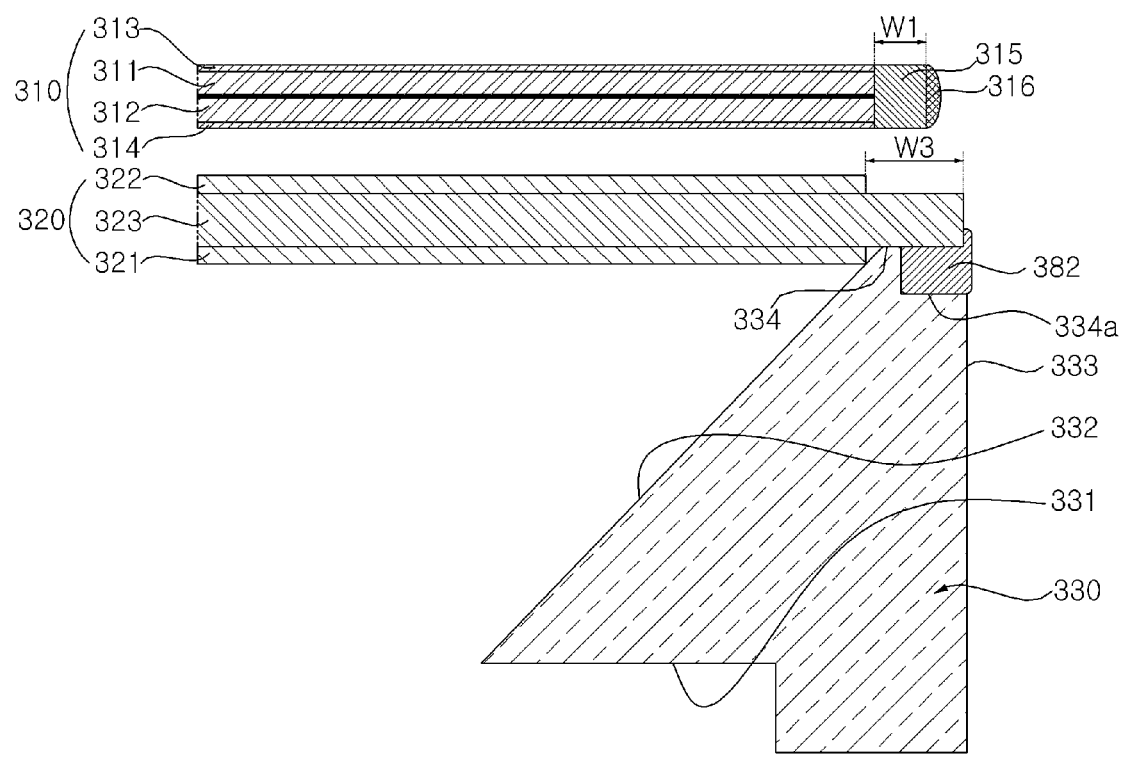
Figure 16:
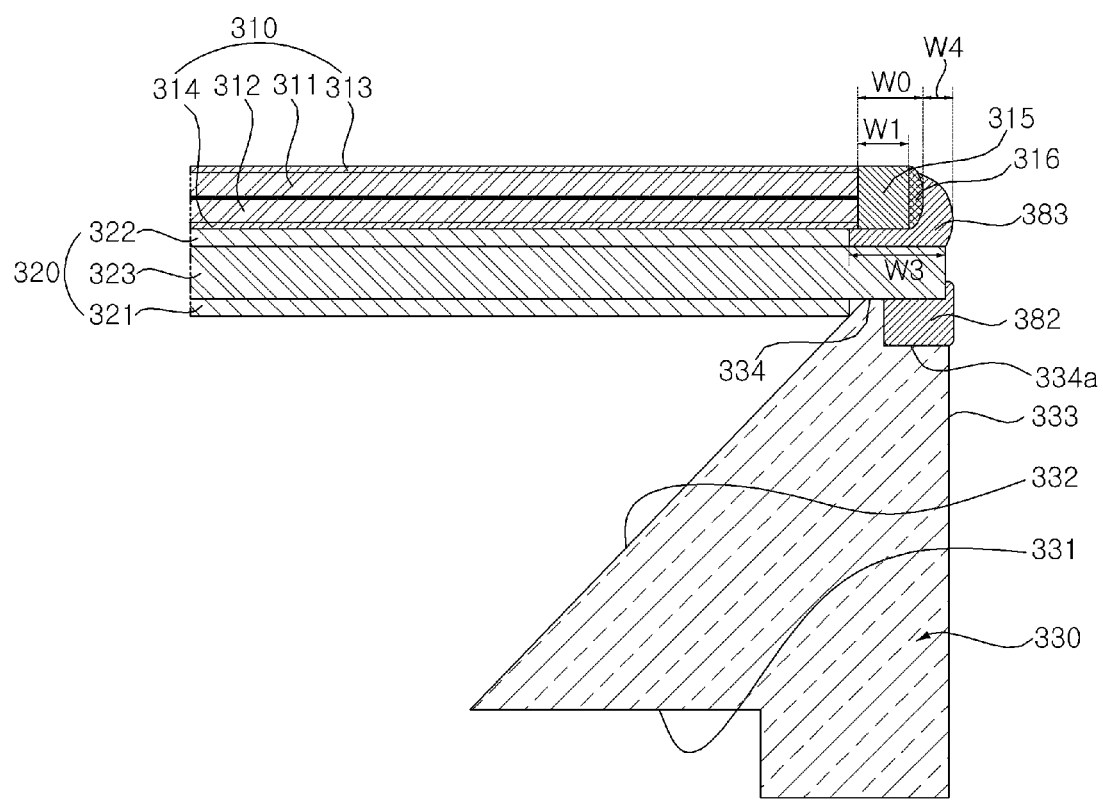

Referring to FIGS. 15 and 16, the display panel 310 may be fixed to the optical plate 320. The adhesive member 383 may be applied to the optical plate 320. The display panel 310 may press the adhesive member 383 applied to the optical plate 320. For example, the adhesive member 383 may be UV resin or thermosetting resin. The adhesive member 383 may be hardened between the glass panel 323, the second optical sheet 322, and the display panel 310.

The width W3 of the glass panel 323 exposed outside may be greater than the width W1 of the inactive part 315 of the display panel 310. The sum W0 of the width W1 of the inactive part 315 and the width of the sealant 316 may be less than the width W3 of the glass panel 323 exposed outside.

The width W4 of the adhesive member 383 applied to the upper surface of the glass panel 323 so as to cover the lateral surface of the sealant 316 of the display panel 310 and the sum W0 of the width of the inactive part 315 and the width of the sealant 316 may be less than the width W3 of the glass panel 323 exposed outside. For example, the width W4 of the adhesive member 383 applied to the upper surface of the glass panel 323 so as to cover the lateral surface of the sealant 316 of the display panel 310 may be 0.5 mm or more.

Figure 17:
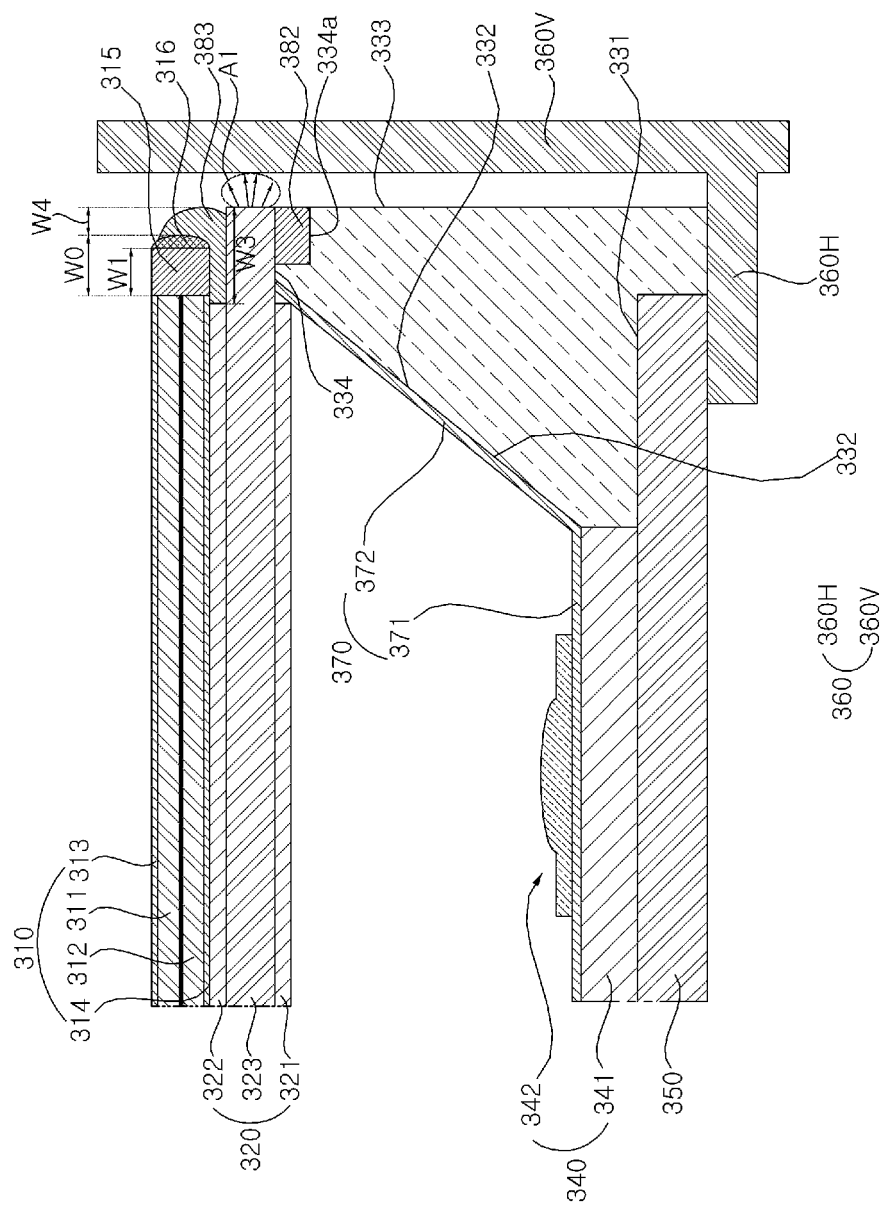

Referring to FIG. 17, the substrate 341 may be placed on the frame 350. The lens 342 may cover a light source mounted on the substrate 341. The guide panel 330 may be coupled to the edge of the frame 350. The guide panel 330 may include a coupling surface 331, a vertical surface 333, and an inclined surface 332.

The coupling surface 331 may define the lower surface of the guide panel 330. The coupling surface 331 may form a step at the lower surface of the guide panel 330. The frame 350 may be fixed to the coupling surface 331 of the guide panel 330.

The vertical surface 333 may extend from the coupling surface 331 of the guide panel 330 in a direction intersecting the coupling surface 331. The vertical surface 333 may be opposite the side frame 360. The inclined surface 332 may interconnect the vertical surface 333 and the coupling surface 331 of the guide panel 330. The inclined surface 332 may form an obtuse angle relative to the substrate 341.

A reflection sheet 370 may be located on the substrate 341 and/or the inclined surface 332 of the guide panel 330. The reflection sheet 370 may include a first part 371 and a second part 372. The first part 371 may be located on the substrate 341, and may be located between the substrate 341 and the lens 342. The second part 372 may extend from the first part 371, and may be located on the inclined surface 332 of the guide panel 330.

The optical plate 320 may be located on or fixed to the guide panel 330. The guide panel 330 may have a seating surface 334. The seating surface 334 may be formed at the upper end of the guide panel 330. The area or size of the first optical sheet 321 and/or the second optical sheet 322 may be less than the area or size of the glass panel 323. For example, the length of the first optical sheet 321 and/or the second optical sheet 322 in the longitudinal direction of the optical plate 320 may be less than the length of the glass panel 323.

A portion of the upper surface and a portion of the lower surface of the glass panel 323 may be exposed outside (W3) in the state of being adjacent to opposite ends of the glass panel 323. The optical plate 320 may be fixed to the seating surface 334 and the receiving surface 334a of the guide panel 330 via an adhesive member 382. For example, the adhesive member 382 may be formed by UV bonding or thermosetting bonding. The adhesive member 382 may be brought into contact with or may be adhered to the exposed lower surface of the glass panel 323 adjacent to the edge thereof.

The display panel 310 may be fixed to the optical plate 320. The adhesive member 383 may be applied to the optical plate 320. The display panel 310 may press the adhesive member 383 applied to the optical plate 320. For example, the adhesive member 383 may be UV resin or thermosetting resin. The adhesive member 383 may be hardened between the glass panel 323, the second optical sheet 322, and the display panel 310.

The width W3 of the glass panel 323 exposed outside may be greater than the width W1 of the inactive part 315 of the display panel 310. The sum W0 of the width W1 of the inactive part 315 and the width of the sealant 316 may be less than the width W3 of the glass panel 323 exposed outside.

The width W4 of the adhesive member 383 applied to the upper surface of the glass panel 323 so as to cover the lateral surface of the sealant 316 of the display panel 310 and the sum W0 of the width of the inactive part 315 and the width of the sealant 316 may be less than the width W3 of the glass panel 323 exposed outside. For example, the width W4 of the adhesive member 383 applied to the upper surface of the glass panel 323 so as to cover the lateral surface of the sealant 316 of the display panel 310 may be 0.5 mm or more.

The side frame 360 may include a horizontal part 360H and a vertical part 360V. The vertical part 360V may cover the vertical surface 333 of the guide panel 330, the lateral surface of the optical plate 320, and the lateral surface of the display panel 310. The horizontal part 360H may extend from the vertical part 360V to the coupling surface 331 of the guide panel 330 and/or the rear surface of the frame 350. The horizontal part 360H may be coupled to the rear surface of the frame 350.

At an area A2 defined between the glass panel 323 and the vertical part 360V of the side frame 360, light may be discharged outside. The light may be monitored from the front surface of the display device.

Figure 18:
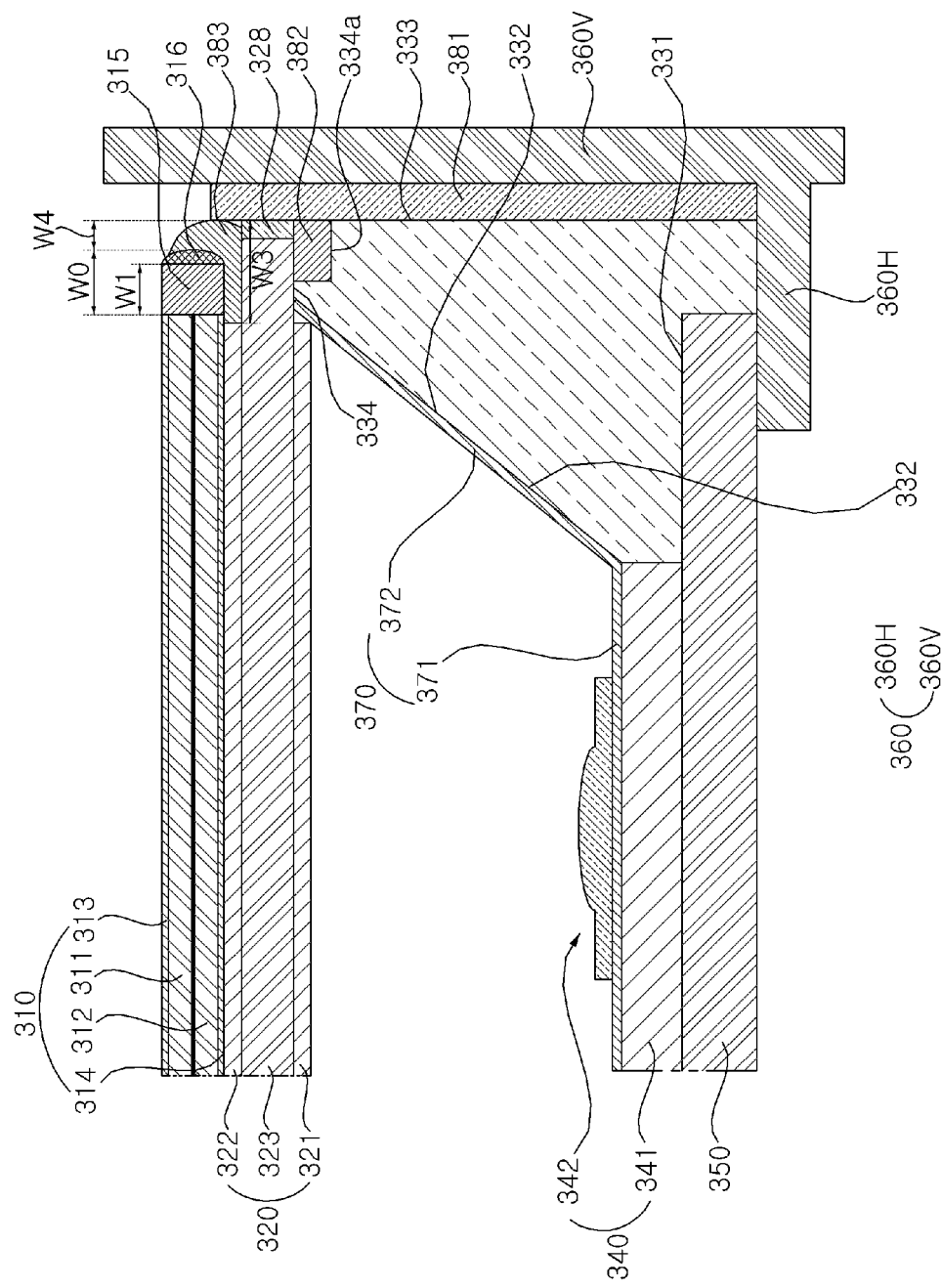

Referring to FIG. 18, the barrier 381 may be located between the guide panel 330 and the side frame 360. The barrier 381 may cover the lateral surface of the optical plate 320. The barrier 381 may be brought into contact with the lateral surface of the optical plate 320 in order to shield light. For example, the barrier 381 may include an absorptive material or a reflective material. The barrier 381 may prevent leakage of light to the lateral surface of the optical plate 320.

A side cover 328 may be located at the lateral surface of the glass panel 323. The side cover 328 may cover the entire lateral surface of the glass panel 323. The side cover 328 may be adhered to, applied to, or printed on the lateral surface of the glass panel 323. For example, the side cover 328 may include an absorptive material or a reflective material. The side cover 328 may prevent leakage of light to the lateral surface of the optical plate 320.

Figure 19:
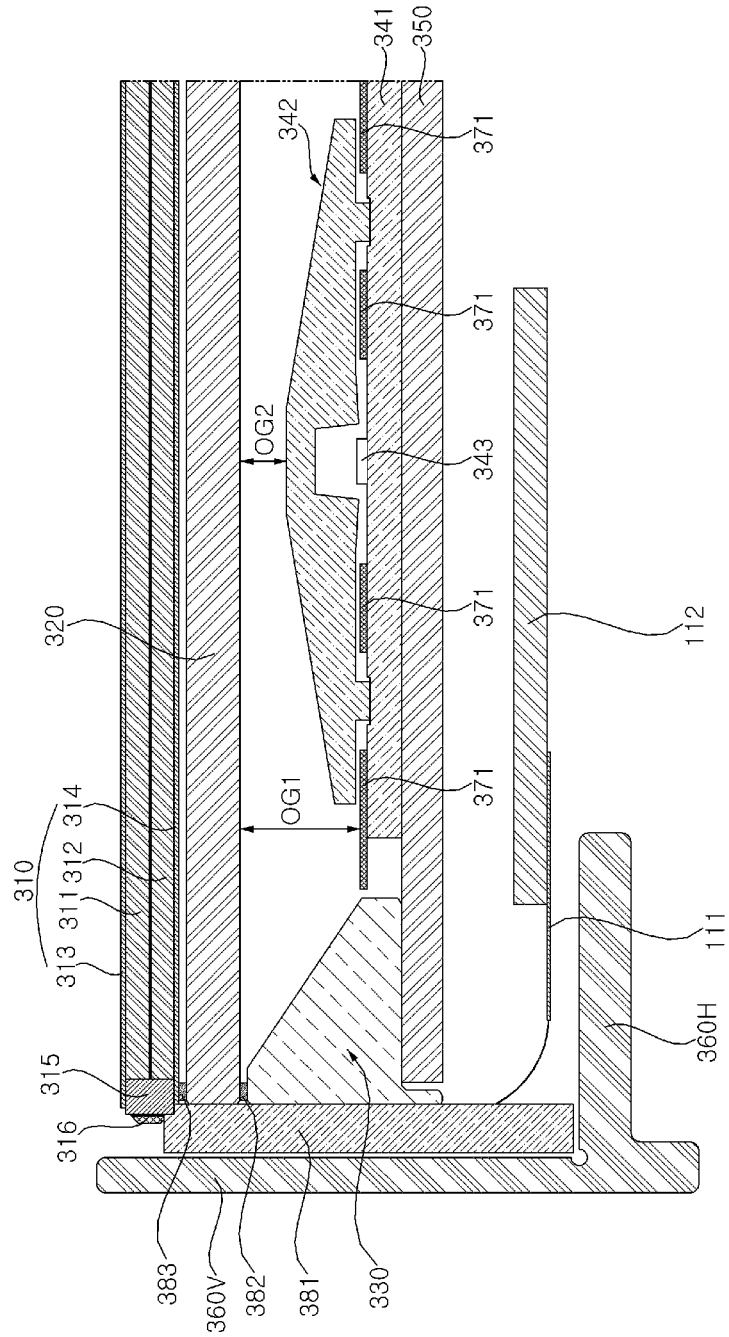

Referring to FIG. 19, a flexible cable 111 may interconnect the display panel 310 and a source PCB 112. For example, the flexible cable 111 may be a flexible printed circuit board (FPCB) or a chip on film (COF). The flexible cable 111 may be located between the barrier 381 and the optical plate 320. The flexible cable 111 may be located between the guide panel 330 and the barrier 381. The flexible cable 111 may extend from the display panel 310 to the source PCB 112.

A light source 343 may be mounted on the substrate 341. As an example, the light source 343 may be an LED. As another example, the light source 343 may be a chip on board (COB). The lens 342 may be located on the substrate 341 while covering the light source 343.

A reflection sheet 371 may be located on the substrate 341. The reflection sheet 371 may be located between the lens 342 and the substrate 341. The reflection sheet 371 may be located only on the substrate 341, and the guide panel 330 may include a reflective material or a white color in order to replace the reflection sheet.

A second optical distance OG2 between the top of the lens 342 and the optical plate 320 may be less than a first optical distance OG1 between the reflection sheet 371 and the optical plate 320. For example, the second optical distance OG2 may be less than half of the first optical distance OG1.

In the case in which the optical distance is reduced in order to provide high luminance to the display panel, a large amount of heat may be applied to the display panel and the optical sheets, whereby image quality may be reduced due to thermal expansion and contraction thereof.

In the case in which an optical plate 320 having physical properties identical or similar to those of the display panel 310 is used, high image quality may be maintained even in thermal expansion and contraction situations. Light intensity having high luminance may be provided to the display panel 310, whereby image quality of the display device may be improved.

Figure 20:
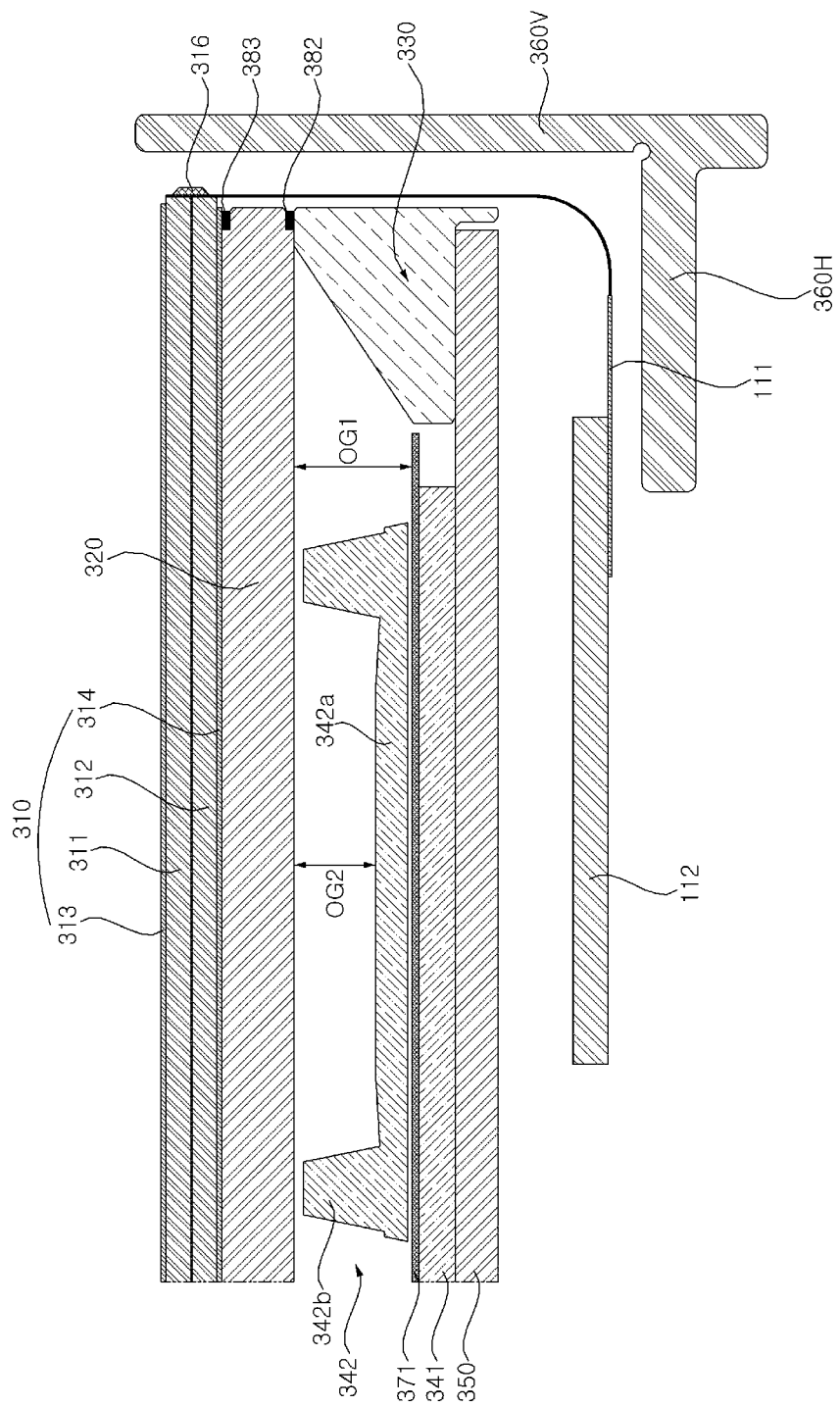

Referring to FIG. 20, the flexible cable 111 may interconnect the display panel 310 and the source PCB 112. For example, the flexible cable 111 may be a flexible printed circuit board (FPCB) or a chip on film (COF). The flexible cable 111 may extend from the display panel 310 to the source PCB 112.

The reflection sheet 371 may be located on the substrate 341. The reflection sheet 371 may be located between the lens 342 and the substrate 341. The reflection sheet 371 may be located only on the substrate 341, and the guide panel 330 may include a reflective material or a white color in order to replace the reflection sheet. The distal end of the reflection sheet 371 may be adjacent to the guide panel 330.

The second optical distance OG2 between the top of the lens 342 and the optical plate 320 may be less than the first optical distance OG1 between the reflection sheet 371 and the optical plate 320. The lens 342 may include a body 342a and a support 342b. The support 342b may protrude from the upper surface of the body 342a, and may extend toward the optical plate 320. A plurality of supports 342b may be formed at the upper surface of the body 342a. The upper end of the support 342b may be adjacent to or in contact with the lower surface of the optical plate 320. The support 342b may support the optical plate 320. The second optical distance OG2 may correspond to the height of the support 342b.

Consequently, drooping of the optical plate 320 and/or the display panel 310, which may occur in a large-size display device, may be prevented. In addition, the lens 342 having the support 342b may effectively provide light from the light source 343 (see FIG. 19) to the display panel 310. The support 342b may change a path of light in the body 342a.

Figure 21:
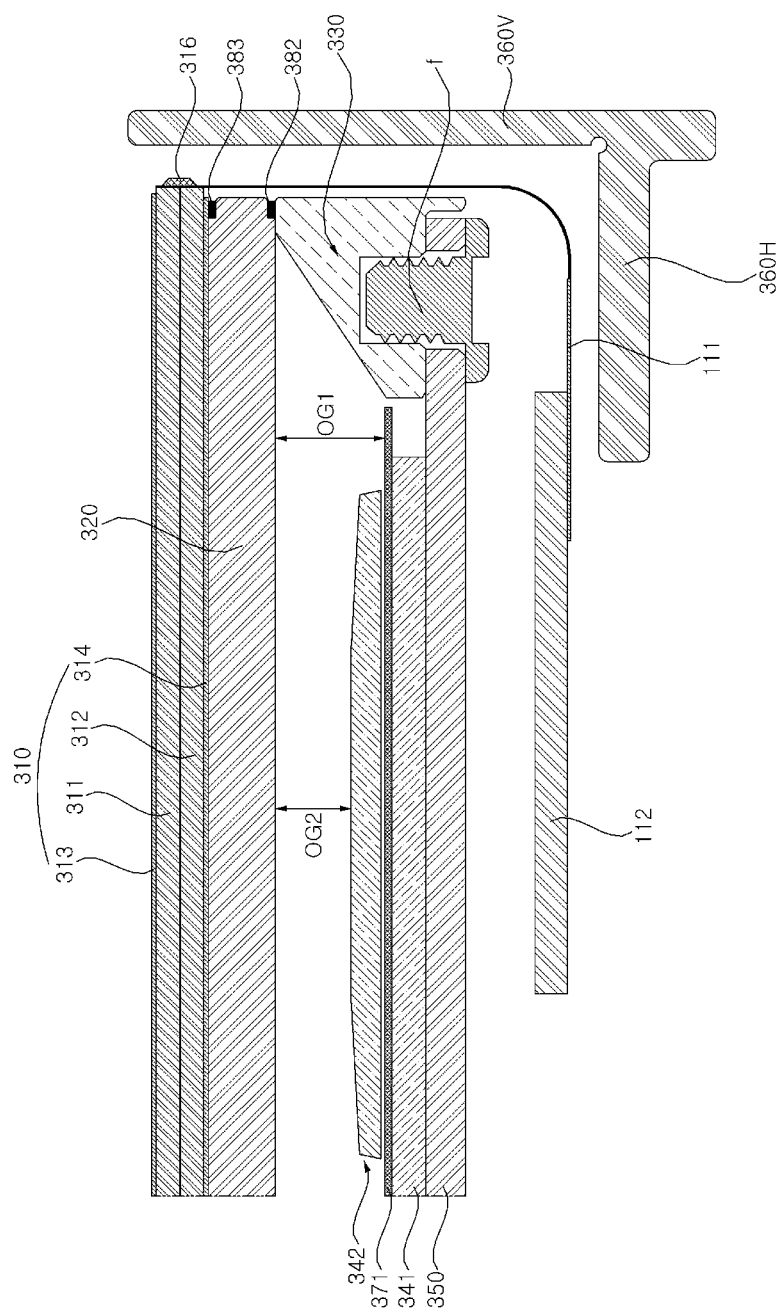

Referring to FIG. 21, the flexible cable 111 may interconnect the display panel 310 and the source PCB 112. For example, the flexible cable 111 may be a flexible printed circuit board (FPCB) or a chip on film (COF). The flexible cable 111 may extend from the display panel 310 to the source PCB 112.

The reflection sheet 371 may be located on the substrate 341. The reflection sheet 371 may be located between the lens 342 and the substrate 341. The reflection sheet 371 may be located only on the substrate 341, and the guide panel 330 may include a reflective material or a white color in order to replace the reflection sheet. The distal end of the reflection sheet 371 may be adjacent to the guide panel 330.

The second optical distance OG2 between the top of the lens 342 and the optical plate 320 may be less than the first optical distance OG1 between the reflection sheet 371 and the optical plate 320.

The guide panel 330 may be fixed to the frame 350. A coupling member f may extend through the front surface from the rear surface of the frame 350, and may then be coupled to the guide panel 330.

Figure 22:
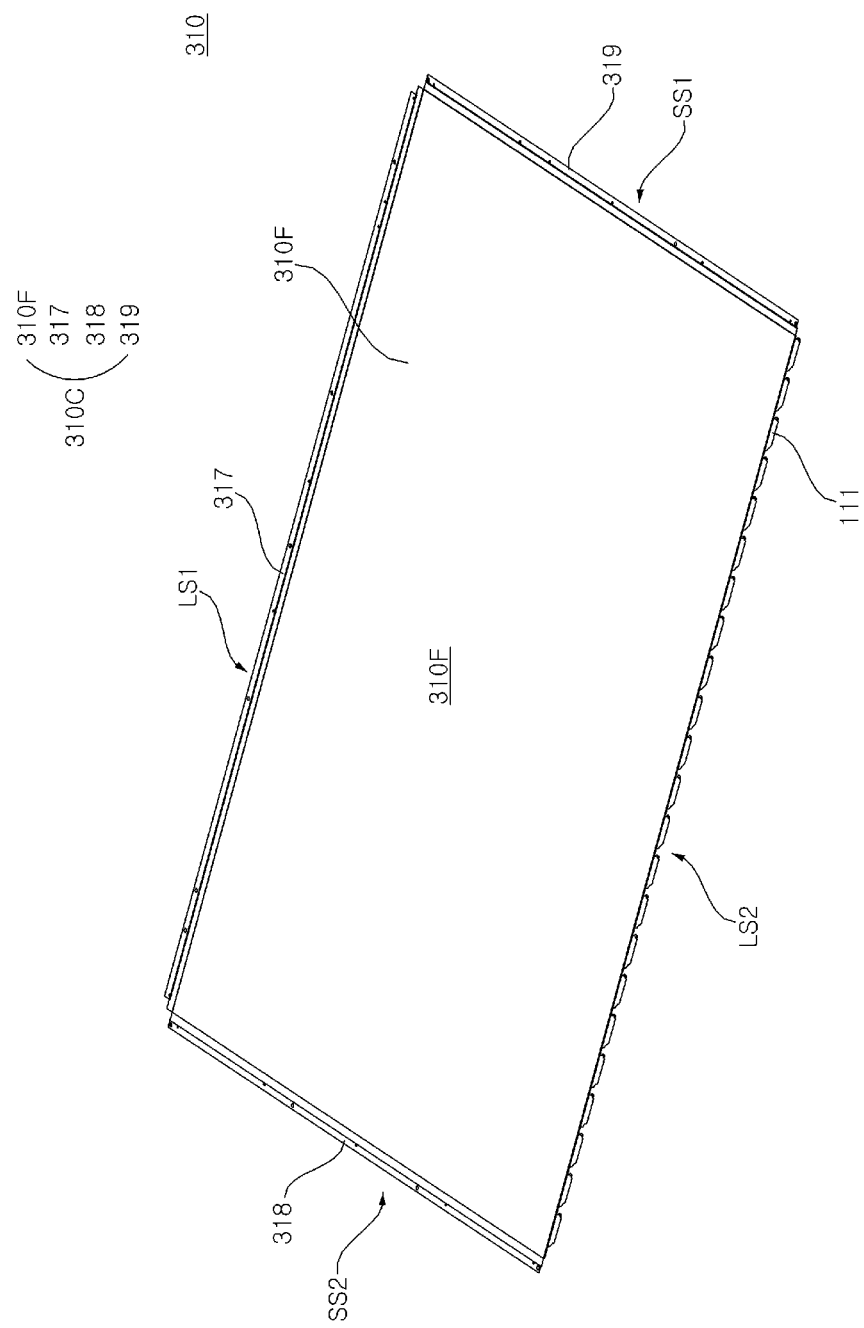

Referring to FIG. 22, a cover film 310C may be coupled to the display panel 310. The cover film 310C may include a front part 301F, a first side part 317, a second side part 318, and a third side part 319. The front part 310F may cover the front surface of the display panel 310. The front part 310F may be adhered to the front surface of the display panel 310. The front part 310F may be transparent. Hereinafter, a description of one of the side parts 317, 318, and 329 may be applied to the others of the side parts 317, 318, and 329. For example, the cover film 310C may be an anti-reflection (AR) film.

The first side part 317 may extend from a first long side LS1 of the front part 310F. The first side part 317 may wrap the first long side LS1 of the display panel 310. The second side part 318 may extend from a second short side SS2 of the front part 310F. The second side part 318 may wrap the second short side SS2 of the display panel 310. The third side part 319 may extend from a first short side SS1 of the front part 310F. The third side part 319 may wrap the first short side SS1 of the display panel 310.

Figure 23:
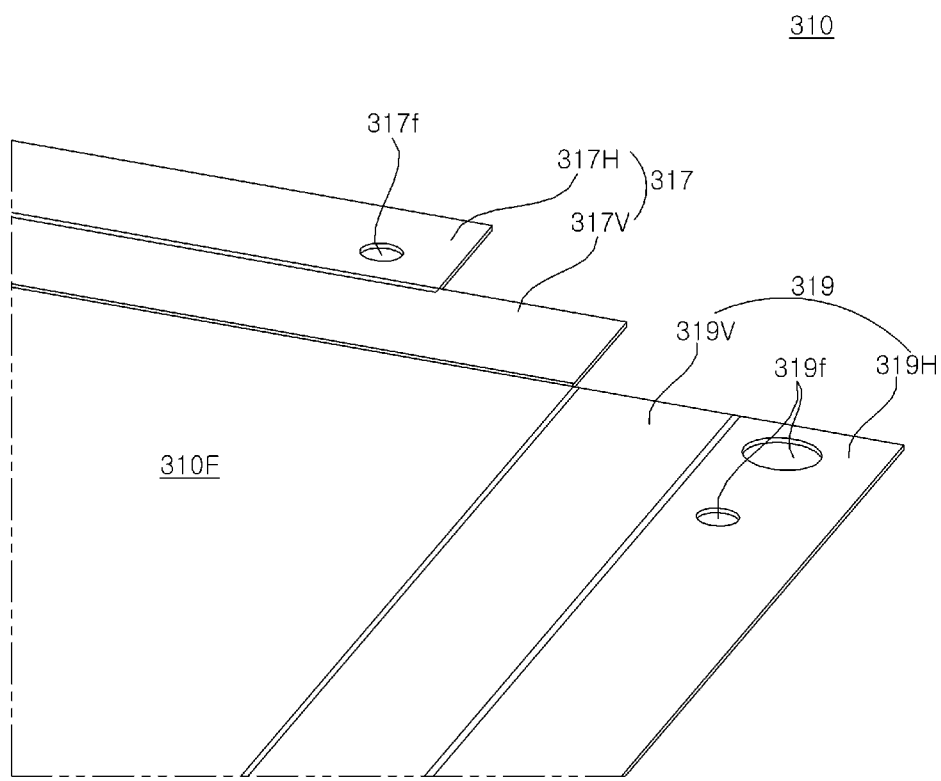
Figure 24:
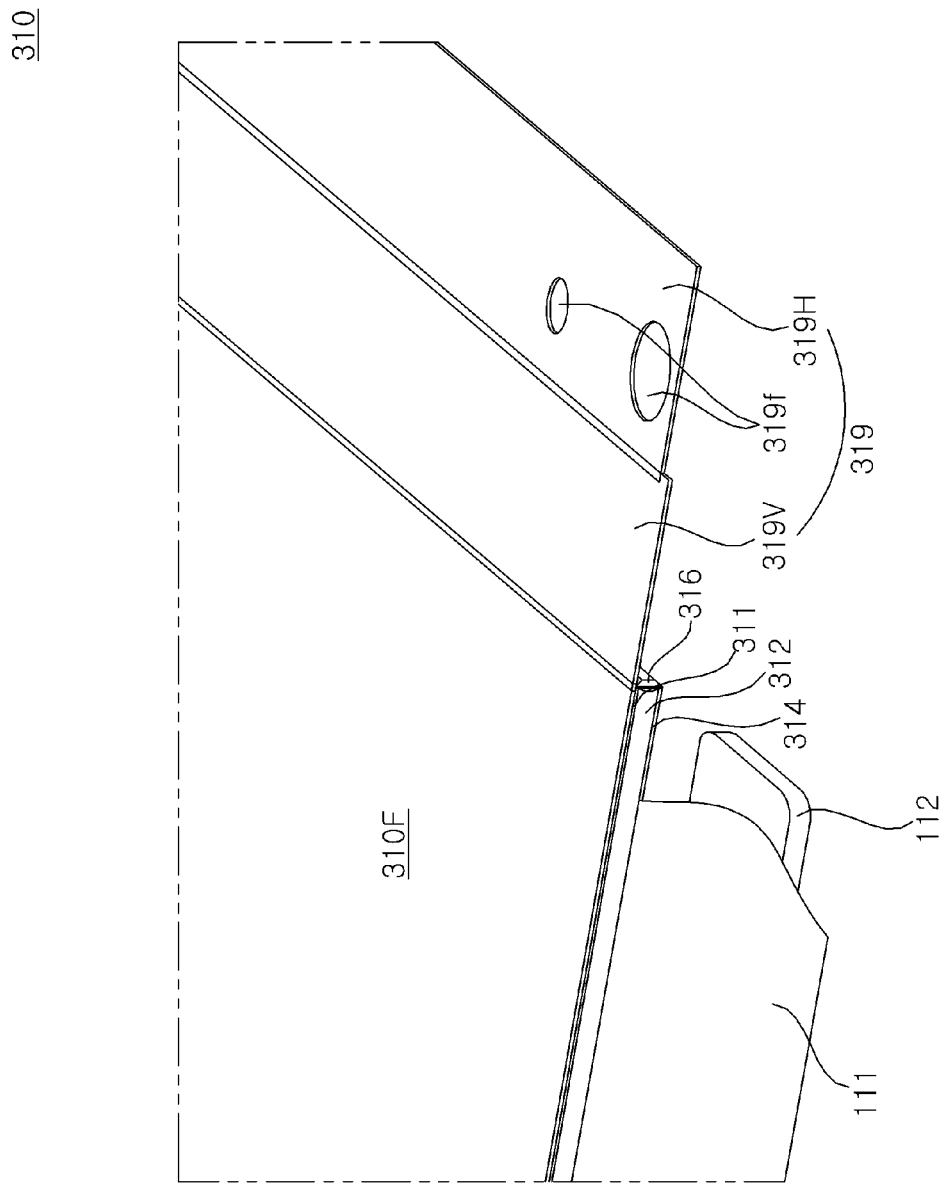

Referring to FIGS. 23 and 24, the first side part 317 may include a vertical part 317V and a horizontal part 317H. The vertical part 317V may extend from and may be bent from the front part 310F. The horizontal part 317H may extend from and may be bent from the vertical part 317V. A coupling hole 317f may be formed in the horizontal part 317H.

The third side part 319 may include a vertical part 319V and a horizontal part 319H. The vertical part 319V may extend from and may be bent from the front part 310F. The horizontal part 319H may extend from and may be bent from the vertical part 319V. Coupling holes 319f may be formed in the horizontal part 319H.

The front part 310F may be transparent. The first side part 317 and/or the third side part 319 may be opaque or semitransparent. Alternatively, the first side part 317 and/or the third side part 319 may include a black color.

The flexible cable 111 may extend from the display panel 310. The flexible cable 111 may extend from one side or the lower surface of the display panel 310. The flexible cable 111 may be electrically connected to a thin film transistor (TFT) provided in the display panel 310. The flexible cable 111 may electrically interconnect the TFT and the source PCB 112.

Figure 25:
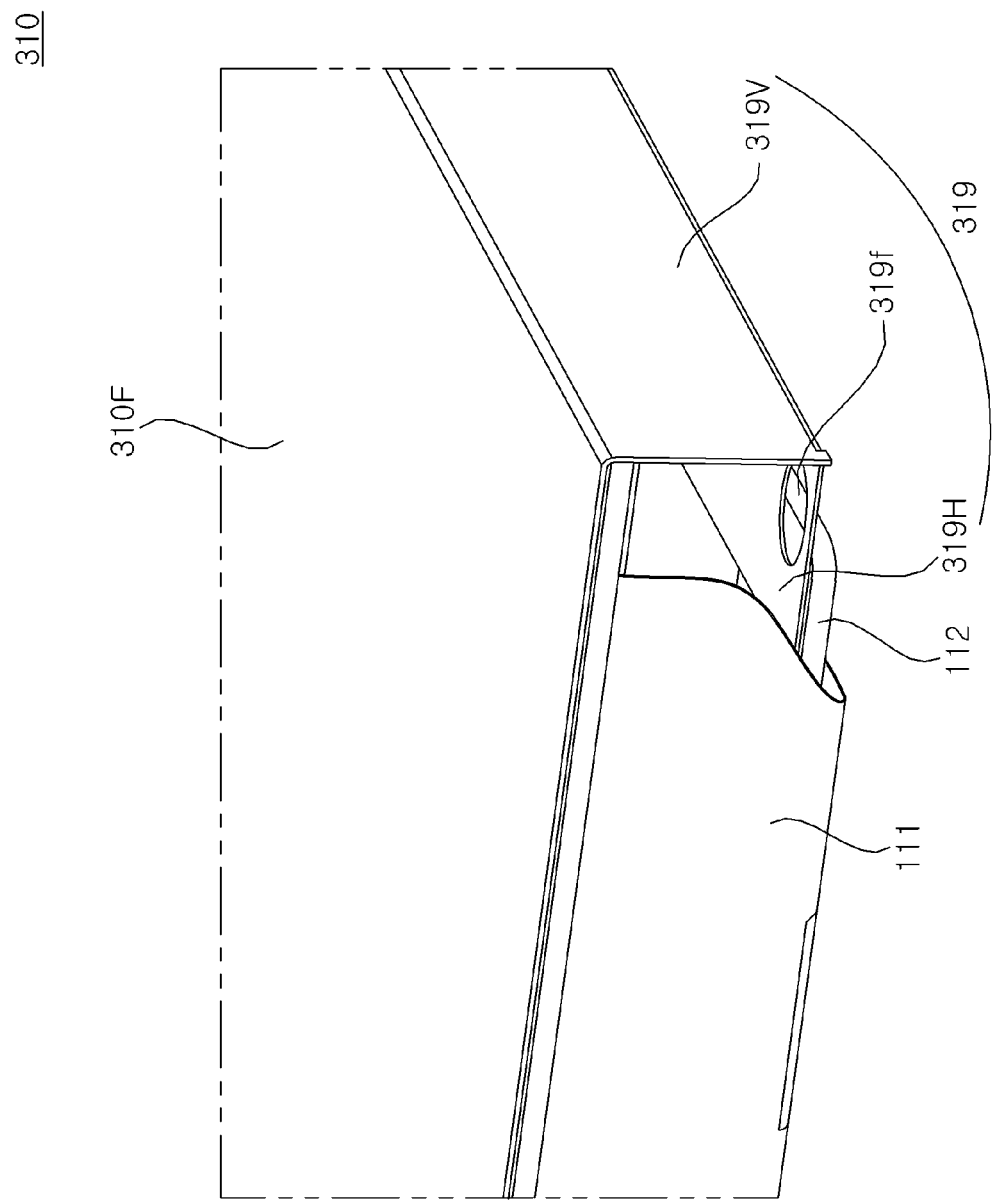
Figure 26:
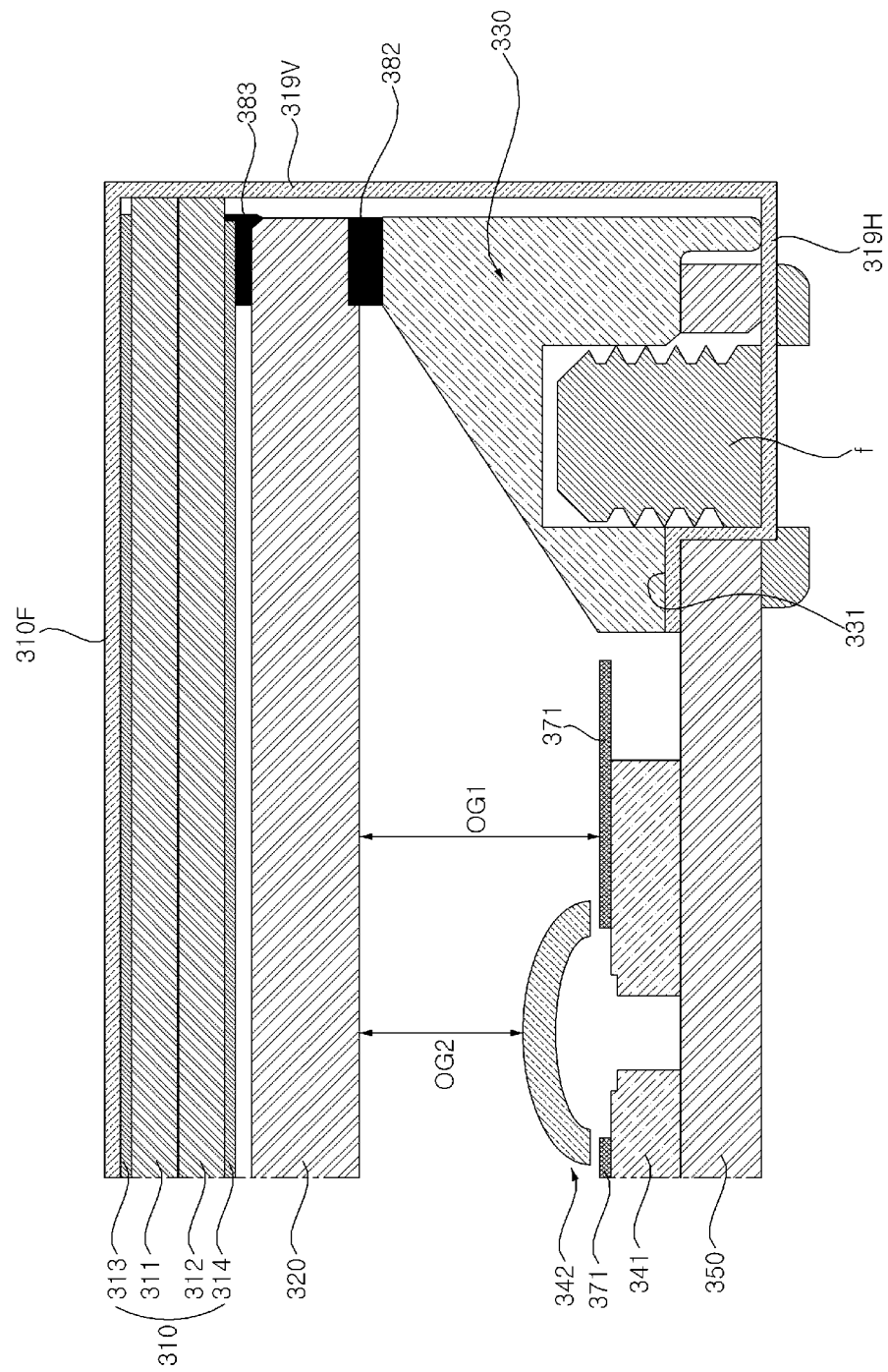

Referring to FIGS. 25 and 26, the cover film 310C (see FIG. 22) may be fixed to the front surface of the display panel 310, and may cover the lateral surface of the display panel 310. The flexible cable 111 may extend from the lateral surface of the display panel 310. The cover film 310C may not cover the lateral surface of the display panel 310, from which the flexible cable 111 extends, and therefore the lateral surface of the display panel 310 may be open.

The third side part 319 may cover the lateral surface of the display panel 310, the lateral surface of the optical plate 320, and the lateral surface of the guide panel 330, and may be fixed to the frame 350. The vertical part 319V of the third side part 319 may cover the lateral surface of the display panel 310, the lateral surface of the optical plate 320, and the lateral surface of the guide panel 330.

The horizontal part 319H of the third side part 319 may be inserted between the frame 350 and the guide panel 330 while wrapping the coupling surface 331 of the guide panel 330. The horizontal part 319H of the third side part 319 may be press-fit between the distal end of the frame 350 and the guide panel 330. The frame 350 may be coupled to the guide panel 330 in the state in which the horizontal part 319H of the third side part 319 is placed at the guide panel 330, whereby the horizontal part 319H of the third side part 319 may be fixed to the frame 350 and the guide panel 330. The fastening member f may be coupled to the guide panel 330. At this time, the fastening member f may extend through the horizontal part 319H of the third side part 319. Consequently, the cover film 310C may be securely coupled, and packaging of the display panel 310, the optical plate 320, the guide panel 330, and the frame 350 may be secured.

Figure 27:
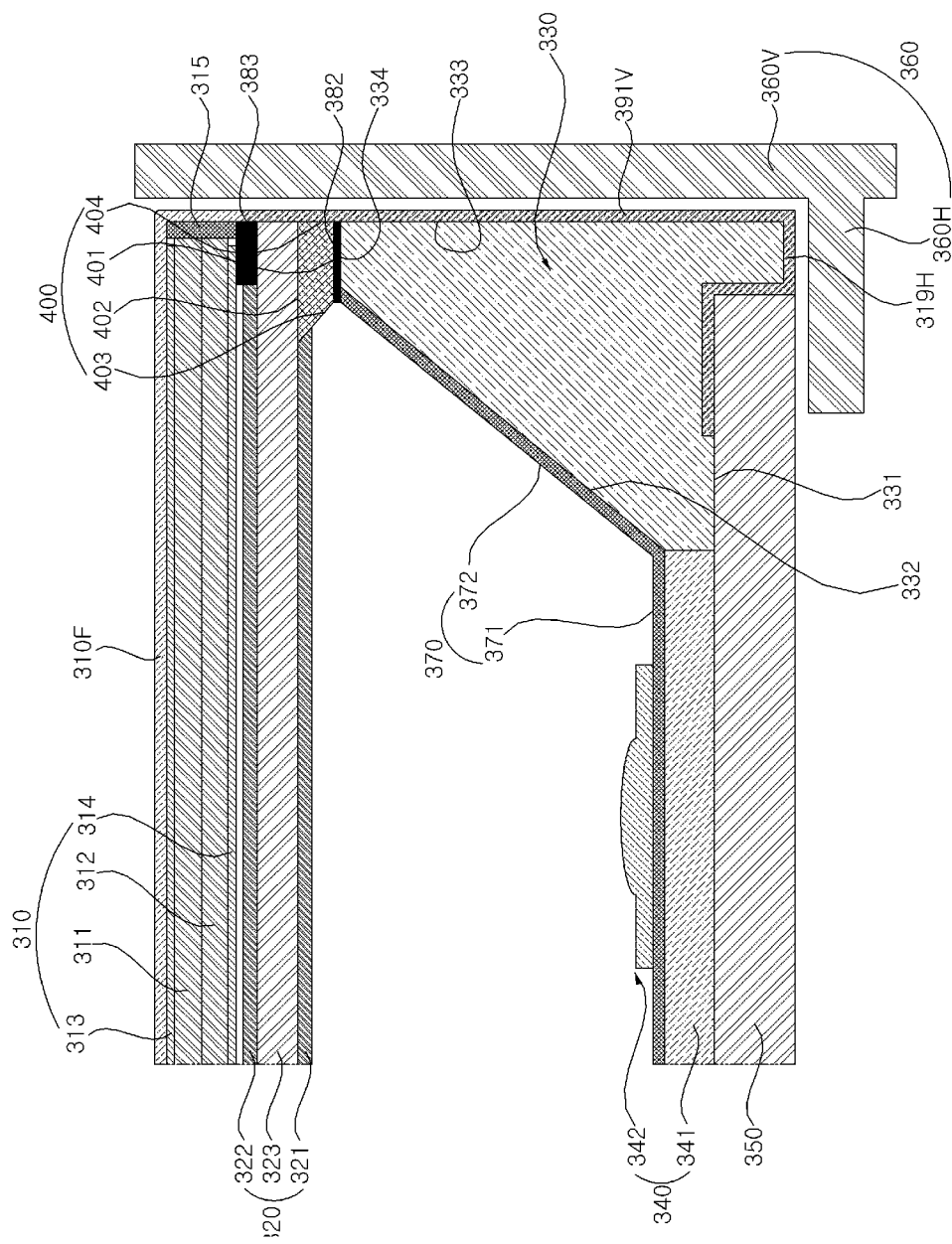

Referring to FIG. 27, the substrate 341 may be placed on the frame 350. The lens 342 may cover a light source mounted on the substrate 341. The guide panel 330 may be coupled to the edge of the frame 350. The guide panel 330 may include a coupling surface 331, a vertical surface 333, and an inclined surface 332.

The coupling surface 331 may define the lower surface of the guide panel 330. The coupling surface 331 may form a step at the lower surface of the guide panel 330. The frame 350 may be fixed to the coupling surface 331 of the guide panel 330.

The vertical surface 333 may extend from the coupling surface 331 of the guide panel 330 in a direction intersecting the coupling surface 331. The vertical surface 333 may be opposite the side frame 360. The inclined surface 332 may interconnect the vertical surface 333 and the coupling surface 331 of the guide panel 330. The inclined surface 332 may form an obtuse angle relative to the substrate 341.

The reflection sheet 370 may be located on the substrate 341 and/or the inclined surface 332 of the guide panel 330. The reflection sheet 370 may include a first part 371 and a second part 372. The first part 371 may be located on the substrate 341, and may be located between the substrate 341 and the lens 342. The second part 372 may extend from the first part 371, and may be located on the inclined surface 332 of the guide panel 330.

An optical bar 400 may be located on or fixed to the guide panel 330. The optical bar 400 may be located between the guide panel 330 and the optical plate 320. The optical bar 400 may have a first surface 401, a second surface 402, an inclined surface 403, and an outer surface 404. The first surface 401 and the second surface 402 may be opposite each other. The first surface 401 may be fixed to the seating surface 334 of the guide panel 330 via an adhesive member 382. The second surface 402 may be opposite or may be brought into contact with the glass panel 323 of the optical plate 320. The inclined surface 403 may interconnect the first surface 401 and the second surface 402. The outer surface 404 may be opposite the inclined surface 403. The area of the second surface 402 may be greater than the area of the first surface 401. The overall section of the optical bar 400 may have an inverse trapezoidal shape.

The inclined surface 403 may be referred to as an incidence surface 403, and the second surface 402 may be referred to as an exit surface 402. The first surface 401 and the outer surface 404 may be referred to as reflective surfaces 401 and 404. Light incident on the inclined surface 403 may be totally reflected and/or reflected in the optical bar 400, and may be discharged to the glass panel 323 through the second surface 402. Consequently, light may be uniformly provided even to the contour of the display panel 310.

The optical plate 320 may be located on or fixed to the optical bar 400. The area or size of the first optical sheet 321 and/or the second optical sheet 322 may be less than the area or size of the glass panel 323. For example, the length of the first optical sheet 321 and/or the second optical sheet 322 in the longitudinal direction of the optical plate 320 may be less than the length of the glass panel 323.

The optical bar 400 may be fixed to the seating surface 334 of the guide panel 330 via an adhesive member 382. For example, the adhesive member 382 may be formed by UV bonding or thermosetting bonding. The adhesive member 382 may be brought into contact with or may be adhered to the first surface 401 of the optical bar 400.

The display panel 310 may be located at the upper side of the optical plate 320. The display panel 310 may include a front substrate 311, a rear substrate 312, a front polarizing film 313, and a rear polarizing film 314. The front substrate 311 and the rear substrate 312 may be opposite each other. The front polarizing film 313 may be adhered or fixed to the front substrate 311. The rear polarizing film 314 may be adhered or fixed to the rear substrate 312. An inactive part 315 may be formed at the lateral surface of the front substrate 311 and/or the rear substrate 312. For example, the inactive part may be a black matrix.

An adhesive member 383 may be located between the display panel 310 and the optical plate 320. For example, the adhesive member 383 may be formed by UV bonding or thermosetting bonding. The adhesive member 383 may be transparent.

The side frame 360 may include a horizontal part 360H and a vertical part 360V. The vertical part 360V may cover the vertical surface 333 of the guide panel 330 wrapped by the cover film 310C (see FIG. 22), the lateral surface of the optical plate 320, and the lateral surface of the display panel 310. The horizontal part 360H may extend from the vertical part 360V to the coupling surface 331 of the guide panel 330 and/or the rear surface of the frame 350. The horizontal part 360H may be coupled to the rear surface of the frame 350.

The third side part 319 may cover the lateral surface of the display panel 310, the lateral surface of the optical plate 320, the outer surface 404 of the optical bar 400, and the lateral surface of the guide panel 330, and may be fixed to the frame 350. The vertical part 319V of the third side part 319 may cover the lateral surface of the display panel 310, the lateral surface of the optical plate 320, the outer surface 404 of the optical bar 400, and the lateral surface of the guide panel 330. As an example, the vertical part 319V of the third side part 319 of the cover film 310C may include a reflective material or an absorptive material. As another example, the vertical part 319V of the third side part 319 may be a black film.

The horizontal part 319H of the third side part 319 may be inserted between the frame 350 and the coupling surface 331 of the guide panel 330. The frame 350 may be coupled to the guide panel 330 while pushing the horizontal part 319H of the third side part 319 placed on the coupling surface 331 of the guide panel 330.

Figure 28:
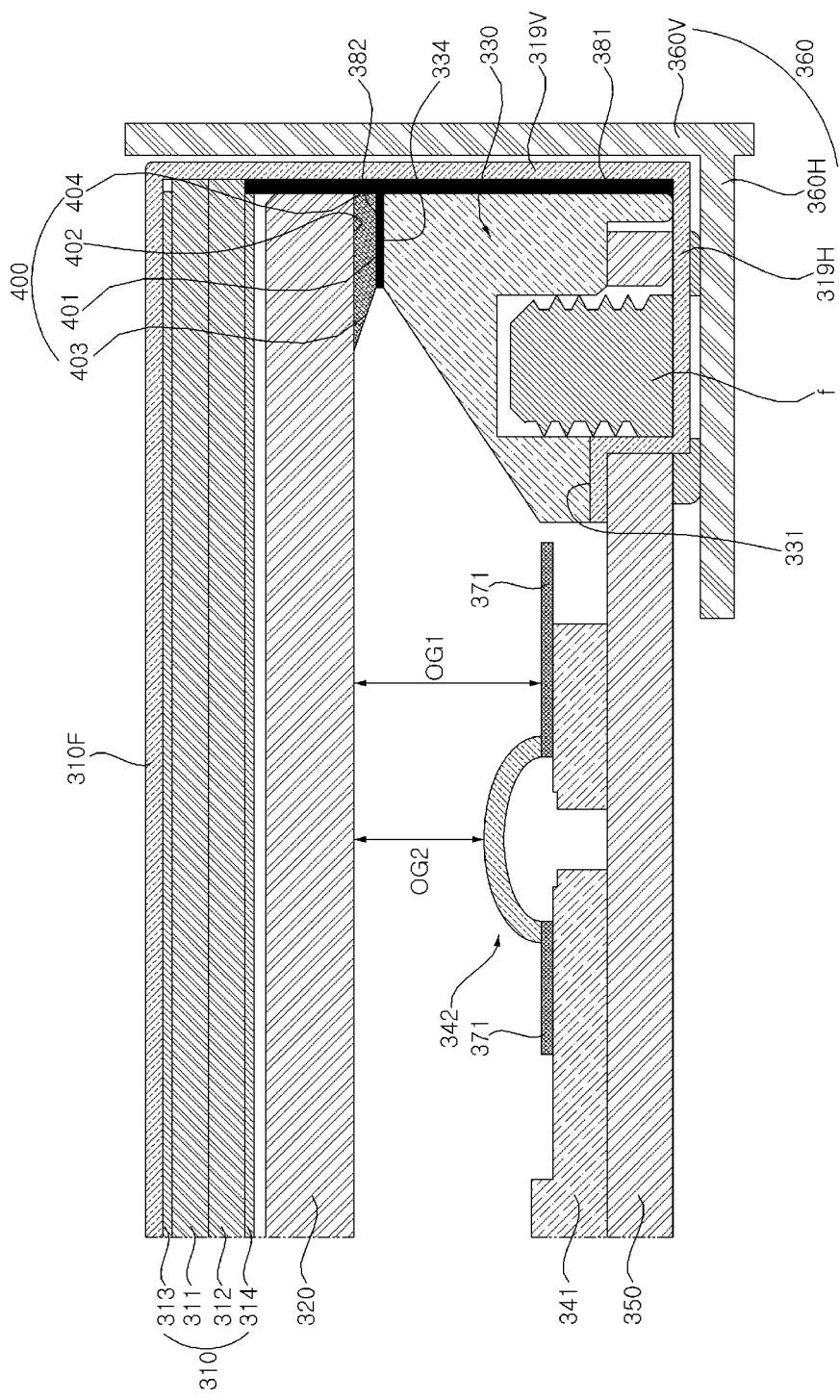

Referring to FIG. 28, the optical bar 400 may be located on or fixed to the guide panel 330. The optical bar 400 may be located between the guide panel 330 and the optical plate 320.

The optical bar 400 may have a first surface 401, a second surface 402, an inclined surface 403, and an outer surface 404. The first surface 401 and the second surface 402 may be opposite each other. The first surface 401 may be fixed to the seating surface 334 of the guide panel 330 via an adhesive member 382. The second surface 402 may be opposite or may be brought into contact with the glass panel 323 of the optical plate 320. The inclined surface 403 may interconnect the first surface 401 and the second surface 402. The outer surface 404 may be opposite the inclined surface 403. The area of the second surface 402 may be greater than the area of the first surface 401. The overall section of the optical bar 400 may have an inverse trapezoidal shape.

The inclined surface 403 may be referred to as an incidence surface 403, and the second surface 402 may be referred to as an exit surface 402. The first surface 401 and the outer surface 404 may be referred to as reflective surfaces 401 and 404. Light incident on the inclined surface 403 may be totally reflected and/or reflected in the optical bar 400, and may be discharged to the glass panel 323 through the second surface 402. Consequently, light may be uniformly provided even to the contour of the display panel 310.

The optical bar 400 may be fixed to the seating surface 334 of the guide panel 330 via an adhesive member 382. For example, the adhesive member 382 may be formed by UV bonding or thermosetting bonding. The adhesive member 382 may be brought into contact with or may be adhered to the first surface 401 of the optical bar 400.

The third side part 319 of the cover film 310C may cover the lateral surface of the display panel 310, the lateral surface of the optical plate 320, the outer surface of the optical bar 400, and the lateral surface of the guide panel 330, and may be fixed to the frame 350. The vertical part 319V of the third side part 319 may cover the lateral surface of the display panel 310, the lateral surface of the optical plate 320, the outer surface of the optical bar 400, and the lateral surface of the guide panel 330.

The barrier 381 may be located inside the third side part 319 of the cover film 310C. The barrier 381 may be located between the optical plate 320, the optical bar 400, the guide panel 330, and the vertical part 319V of the third side part 319 of the cover film 310C. For example, the barrier 381 may be a reflective sheet or an absorptive sheet.

The horizontal part 319H of the third side part 319 may be inserted between the frame 350 and the guide panel 330 while wrapping the coupling surface 331 of the guide panel 330. The horizontal part 319H of the third side part 319 may be press-fit between the distal end of the frame 350 and the guide panel 330.

The frame 350 may be coupled to the guide panel 330 in the state in which the horizontal part 319H of the third side part 319 is placed at the guide panel 330, whereby the horizontal part 319H of the third side part 319 may be fixed to the frame 350 and the guide panel 330. The fastening member f may be coupled to the guide panel 330. At this time, the fastening member f may extend through the horizontal part 319H of the third side part 319. Consequently, the cover film 310C may be securely coupled, and packaging of the display panel 310, the optical plate 320, the optical bar 400, the guide panel 330, the frame 350, and the barrier 381 may be secured.

In accordance with an aspect of the present disclosure, provided is a display device including a display panel, a frame located at the rear of the display panel, an optical plate located between the frame and the display panel, a guide panel coupled to the frame, the guide panel being configured to support the optical plate, the guide panel being configured to provide a space between the optical plate and the frame, and a light source and a substrate configured to provide light to the optical plate in the space, wherein the display panel includes an active area configured to display an image and an inactive area formed at the edge of the active area, the inactive area being configured not to display an image, the display panel is coupled to the optical plate via a first adhesive member disposed in contact with the inactive area, and the optical plate is fixed to the guide panel via a second adhesive member disposed in contact with an area corresponding to the inactive area between the optical plate and the guide panel.

In accordance with another aspect of the present disclosure, the guide panel may include a vertical surface extending long from the optical plate in a direction toward the frame, a coupling surface coupled to the frame, a seating surface, on which the second adhesive member is located, the seating surface being connected to the vertical surface, and an inclined surface configured to interconnect the seating surface and the coupling surface, the inclined surface being configured to form an obtuse angle relative to the frame.

In accordance with another aspect of the present disclosure, the optical plate may include a glass panel configured to form a core, a first optical sheet located between the glass panel and the display panel, the first optical sheet being coupled to one surface of the glass panel, and a second optical sheet disposed opposite the first optical sheet with respect to the glass panel, the second optical sheet being coupled to the other surface of the glass panel, the area of each of the first optical sheet and the second optical sheet may be less than the area of the glass panel, whereby a portion of the glass panel adjacent to the inactive area of the display panel may be exposed outside, the first adhesive member may be adhered to the display panel and the glass panel, and the second adhesive member may be adhered to the seating surface of the guide panel and the glass panel.

In accordance with another aspect of the present disclosure, the display device may further include a reflection sheet, the reflection sheet including a first part located on the substrate and a second part located at the inclined surface of the guide panel.

In accordance with another aspect of the present disclosure, the display device may further include a barrier configured to cover a lateral surface of the optical plate adjacent to the first adhesive member and the second adhesive member.

In accordance with another aspect of the present disclosure, the barrier may include a reflective material or an absorptive material.

In accordance with another aspect of the present disclosure, the guide panel may further include a receiving surface formed so as to be lower than the seating surface, a step being formed between the receiving surface and the seating surface, and the second adhesive member may be located at the receiving surface.

In accordance with another aspect of the present disclosure, the guide panel may further include a receiving surface formed from the seating surface to the vertical surface in an inclined state, and the second adhesive member may be located at the receiving surface.

In accordance with another aspect of the present disclosure, the display panel may further include a sealant configured to cover the inactive area at a lateral surface of the display panel, and the width of each of the inactive area and the sealant may be less than the width of an exposed surface of the glass panel with which the second adhesive member is in contact.

In accordance with another aspect of the present disclosure, the optical plate may further include a side cover formed at a lateral surface of the glass panel adjacent to the first adhesive member, and the side cover may include an absorptive material or a reflective material.

In accordance with another aspect of the present disclosure, the display device may further include a lens configured to cover the light source, the lens being mounted on the substrate, and a reflection sheet located on the substrate, wherein the reflection sheet may be located between the substrate and the lens, and the distal end of the reflection sheet may be located adjacent to the guide panel.

In accordance with another aspect of the present disclosure, the lens may include a support protruding from an upper surface of the lens and extending toward the optical plate.

In accordance with another aspect of the present disclosure, the support may be adjacent to or in contact with a lower surface of the optical plate.

In accordance with another aspect of the present disclosure, the guide panel may be fixed to the frame via a fastening member extending through the frame.

In accordance with another aspect of the present disclosure, the display device may further include a source printed circuit board (PCB) located at the rear of the frame and a flexible cable extending from the lateral surface of the display panel, the flexible cable being connected to the source PCB.

As is apparent from the above description, the display device according to the present disclosure may have the following effects.

According to at least one of the embodiments of the present disclosure, it is possible to provide a display device including a backlight unit having improved optical efficiency.

According to at least one of the embodiments of the present disclosure, it is possible to provide a display device capable of improving image quality.

According to at least one of the embodiments of the present disclosure, it is possible to provide a display device capable of securing reliability with respect to physical deformation caused by heat.

According to at least one of the embodiments of the present disclosure, it is possible to provide a backlight structure capable of providing light having high luminance and uniform distribution to a display panel having a large image display area.

According to at least one of the embodiments of the present disclosure, it is possible to provide a coupling structure of a display device capable of improving a dark area around a display panel.

An additional range of applicability of the present disclosure will be clear from the above description. Those skilled in the art will clearly appreciate that the present disclosure may be variously changed and modified without departing from the idea and scope of the present disclosure. The detailed description and specific embodiments, like preferred embodiments of the present disclosure, are therefore to be construed as illustrative.

Certain embodiments or other embodiments of the disclosure described above are not mutually exclusive or distinct from each other. Any or all elements of the embodiments of the disclosure described above may be combined with each other in configuration or function.

For example, a configuration "A" described in one embodiment of the disclosure and the drawings and a configuration "B" described in another embodiment of the discloser and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addi-

What is claimed is:

1. A display device comprising:
a display panel;
a frame located at a rear of the display panel;
an optical plate located between the frame and the display panel;
a guide panel coupled to the frame, the guide panel being configured to support the optical plate, the guide panel being configured to provide a space between the optical plate and the frame; and
a light source and a substrate configured to provide light to the optical plate in the space,
wherein:
the display panel comprises:
an active area configured to display an image; and
an inactive area formed at an edge of the active area, the inactive area being configured not to display an image,
the display panel is coupled to the optical plate via a first adhesive member disposed in contact with the inactive area,
the optical plate is fixed to the guide panel via a second adhesive member disposed in contact with an area corresponding to the inactive area between the optical plate and the guide panel, and
the guide panel comprises:
a seating surface facing the optical plate; and
a receiving surface formed inwardly of the guide panel from the seating surface and at which the second adhesive member is located.

2. The display device of claim 1, wherein the guide panel further comprises:
a vertical surface extending long from the optical plate in a direction toward the frame and to which the seating surface is connected;
a coupling surface coupled to the frame; and
an inclined surface configured to interconnect the seating surface and the coupling surface, the inclined surface being configured to form an obtuse angle relative to the frame.

3. The display device of claim 2, wherein the optical plate comprises:
a glass panel configured to form a core;
a first optical sheet located between the glass panel and the display panel, the first optical sheet being coupled to one surface of the glass panel; and
a second optical sheet disposed opposite the first optical sheet with respect to the glass panel, the second optical sheet being coupled to the other surface of the glass panel,
an area of each of the first optical sheet and the second optical sheet is less than an area of the glass panel, whereby a portion of the glass panel adjacent to the inactive area of the display panel is exposed outside,
the first adhesive member is adhered to the display panel and the glass panel, and
the second adhesive member is adhered to the receiving surface of the guide panel and the glass panel.

4. The display device of claim 3, further comprising a reflection sheet, the reflection sheet comprising:
a first part located on the substrate; and
a second part located at the inclined surface of the guide panel.

5. The display device of claim 4, further comprising a barrier configured to cover a lateral surface of the optical plate adjacent to the first adhesive member and the second adhesive member.

6. The display device of claim 5, wherein the barrier comprises a reflective material or an absorptive material.

7. The display device of claim 6, wherein
the receiving surface is formed so as to be lower than the seating surface, a step being formed between the receiving surface and the seating surface.

8. The display device of claim 6, wherein
the receiving surface is formed from the seating surface to the vertical surface in an inclined state.

9. The display device of claim 6, wherein
the display panel further comprises a sealant configured to cover the inactive area at a lateral surface of the display panel, and
a width of each of the inactive area and the sealant is less than a width of an exposed surface of the glass panel with which the second adhesive member is in contact.

10. The display device of claim 9, wherein
the optical plate further comprises a side cover formed at a lateral surface of the glass panel adjacent to the first adhesive member, and
the side cover comprises an absorptive material or a reflective material.

11. The display device of claim 3, further comprising:
a lens configured to cover the light source, the lens being mounted on the substrate; and
a reflection sheet located on the substrate, wherein
the reflection sheet is located between the substrate and the lens, and
a distal end of the reflection sheet is located adjacent to the guide panel.

12. The display device of claim 11, wherein the lens comprises a support protruding from an upper surface of the lens and extending toward the optical plate.

13. The display device of claim 12, wherein the support is adjacent to or in contact with a lower surface of the optical plate.

14. The display device of claim 1, wherein the guide panel is fixed to the frame via a fastening member extending through the frame.

15. The display device of claim 1, further comprising:
a source printed circuit board (PCB) located at a rear of the frame; and
a flexible cable extending from a lateral surface of the display panel, the flexible cable being connected to the source PCB.

* * * * *